United States Patent
Asai

(10) Patent No.: US 11,533,402 B2
(45) Date of Patent: Dec. 20, 2022

(54) IMAGE PROCESSING APPARATUS, METHOD OF CONTROLLING THE SAME, AND STORAGE MEDIUM FOR PROJECTING A SCANNED IMAGE AND FOR PRINTING A PROJECTED IMAGE

(71) Applicant: CANON KABUSHIKI KAISHA, Tokyo (JP)

(72) Inventor: Hidehiko Asai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/481,101

(22) Filed: Sep. 21, 2021

(65) Prior Publication Data

US 2022/0103698 A1    Mar. 31, 2022

(30) Foreign Application Priority Data

Sep. 25, 2020    (JP) .............................. JP2020-161326

(51) Int. Cl.
  *H04N 1/00*    (2006.01)
  *H04N 9/31*    (2006.01)
  *G06F 3/12*    (2006.01)
  *H04N 1/21*    (2006.01)

(52) U.S. Cl.
  CPC ....... *H04N 1/00129* (2013.01); *G06F 3/1206* (2013.01); *G06F 3/1253* (2013.01); *H04N 1/00074* (2013.01); *H04N 1/00278* (2013.01); *H04N 1/00413* (2013.01); *H04N 1/00811* (2013.01); *H04N 1/00822* (2013.01); *H04N 1/21* (2013.01); *H04N 9/31* (2013.01)

(58) Field of Classification Search
  None
  See application file for complete search history.

(56) References Cited

U.S. PATENT DOCUMENTS

2018/0146118 A1* 5/2018 Miyamoto ......... H04N 1/00376
2018/0343426 A1* 11/2018 Wada ....................... G09G 5/32

FOREIGN PATENT DOCUMENTS

JP    2001-103473 A    4/2001
JP    2017-038242 A    2/2017

\* cited by examiner

*Primary Examiner* — Andrew H Lam
(74) *Attorney, Agent, or Firm* — Canon U.S.A., Inc. IP Division

(57) ABSTRACT

Embodiments of the present disclosure provide an image processing apparatus comprising: a reader that reads an image from a document; a projection unit that projects an image; a printer that prints an image onto a sheet; an operation unit that accepts a first instruction for the projection unit to project the image read by the reader and a second instruction for the printer to print the image projected by the projection unit; and a control unit, wherein in a case where the first instruction is accepted by the operation unit, the control unit causes the projection unit to project the image read by the reader, and in a case where the second instruction is accepted by the operation unit, the control unit causes the printer to print the image being projected by the projection unit.

10 Claims, 28 Drawing Sheets

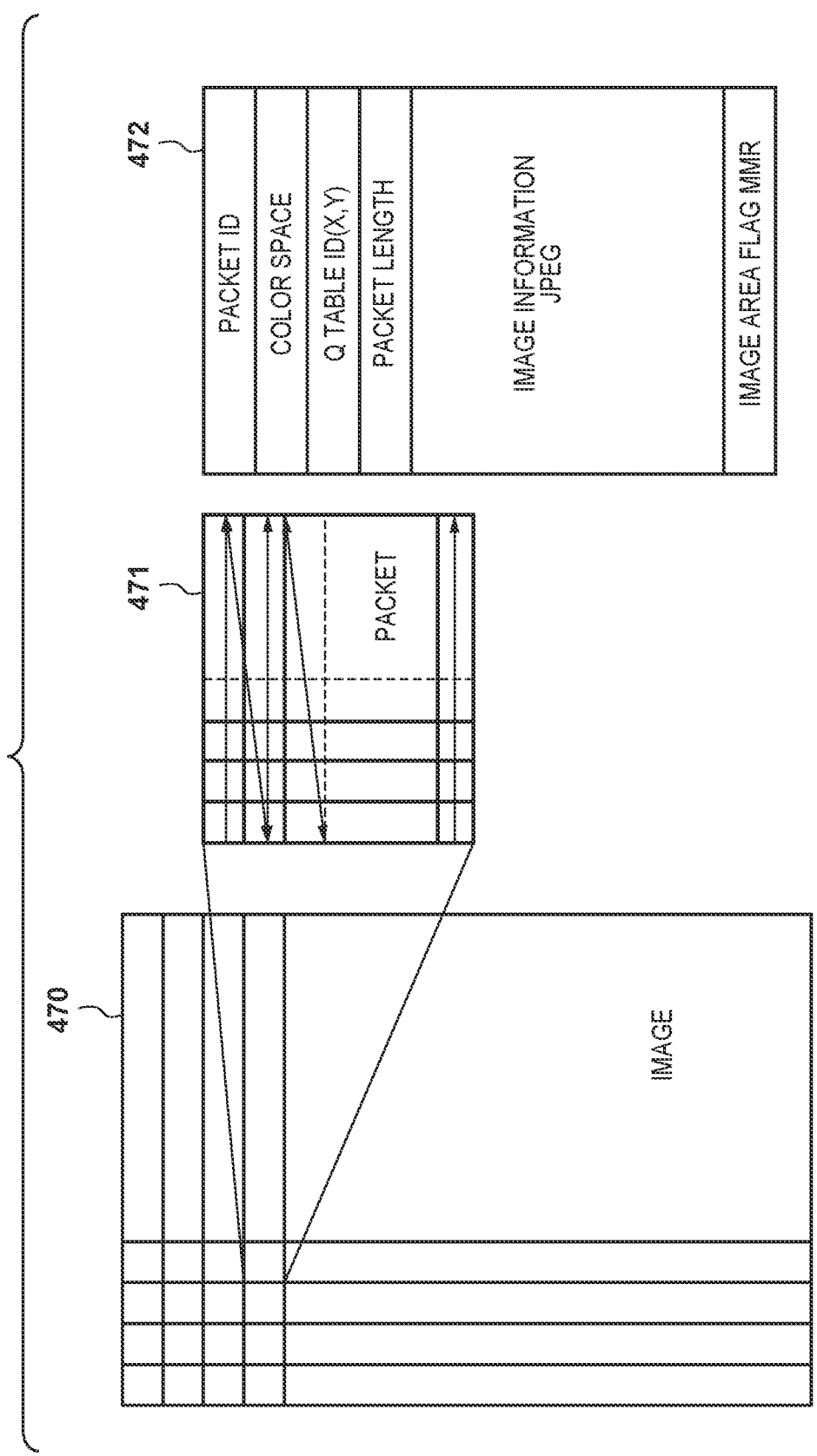

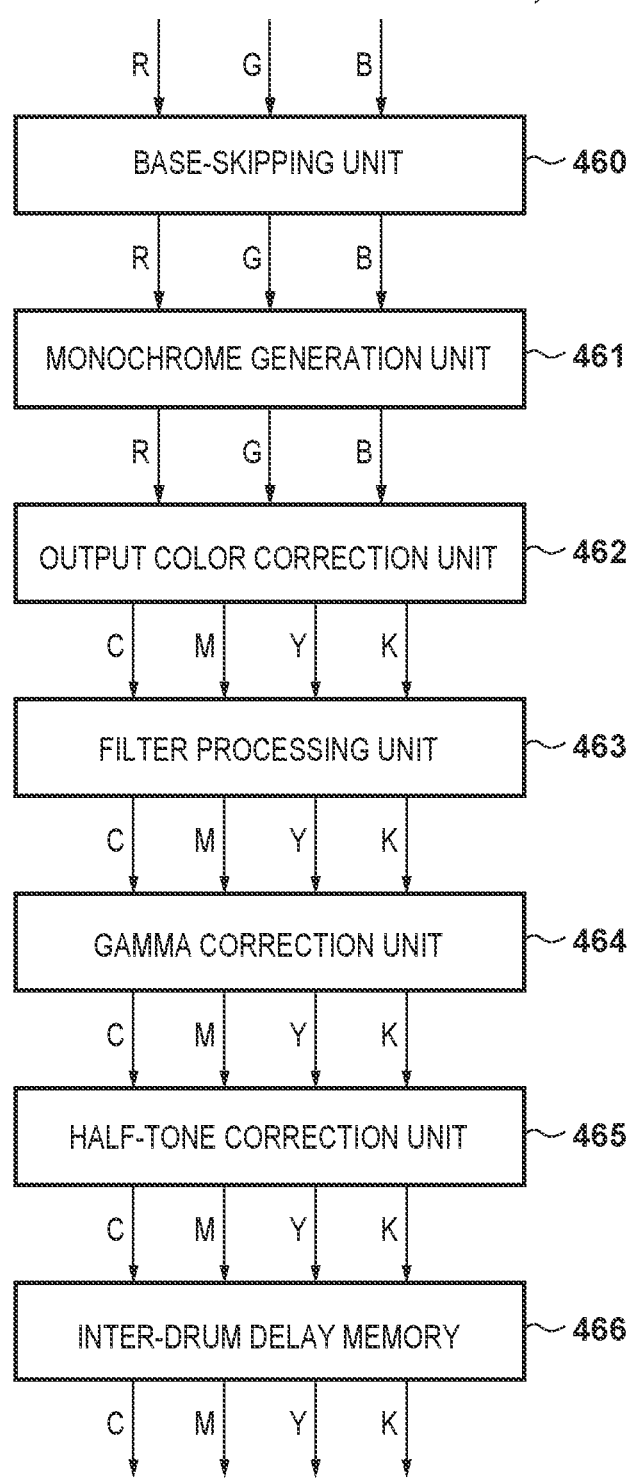

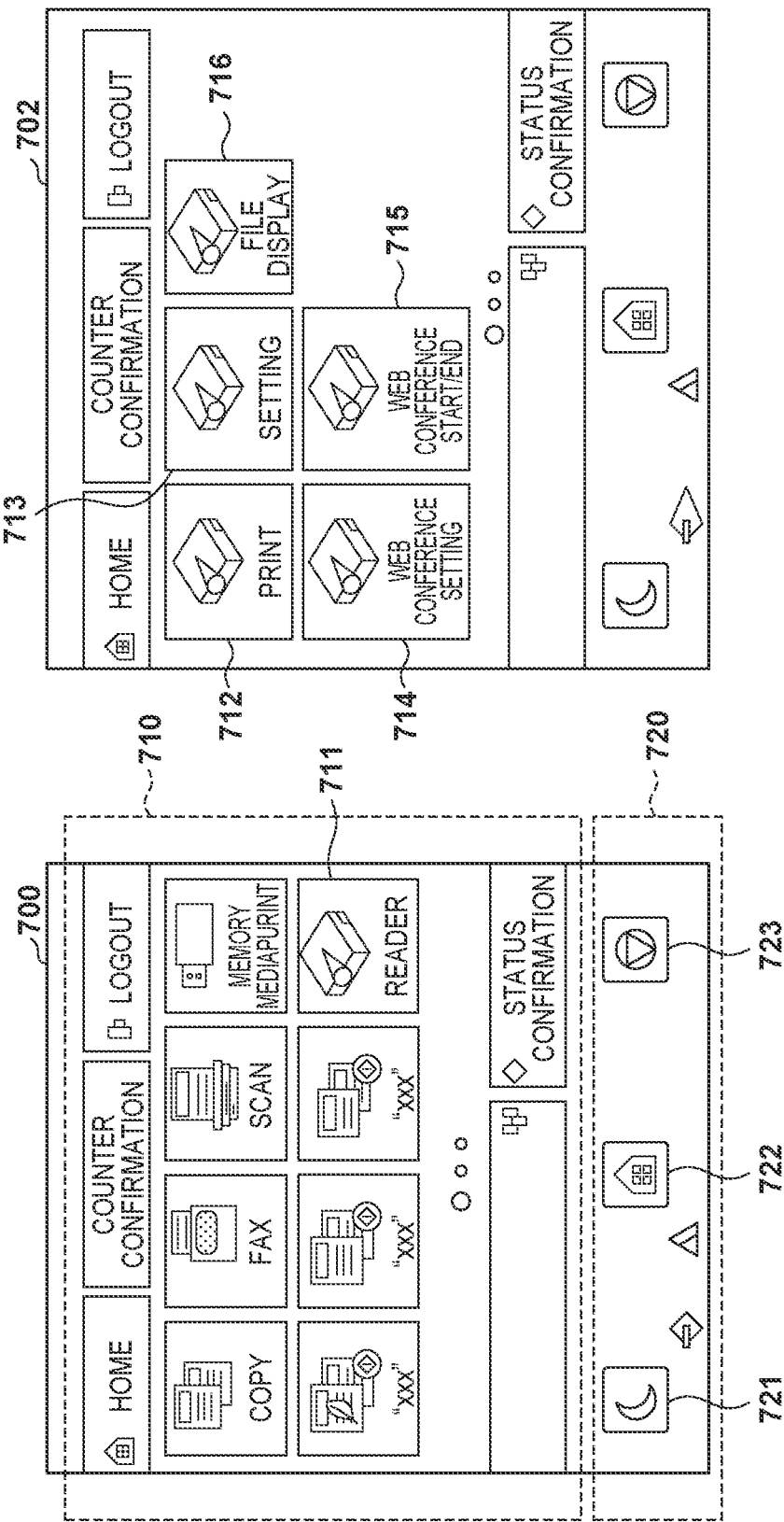

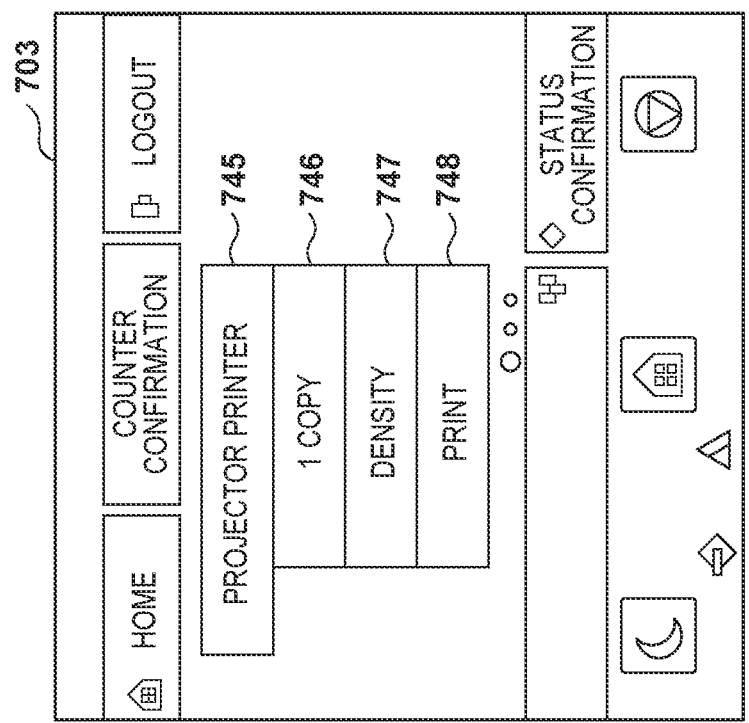
FIG. 7A3
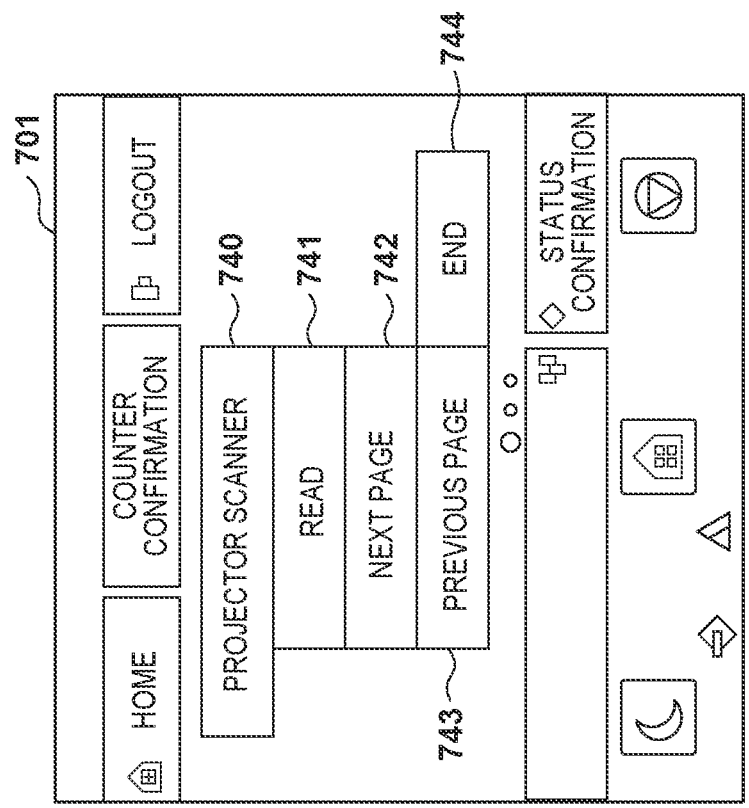
FIG. 7A4

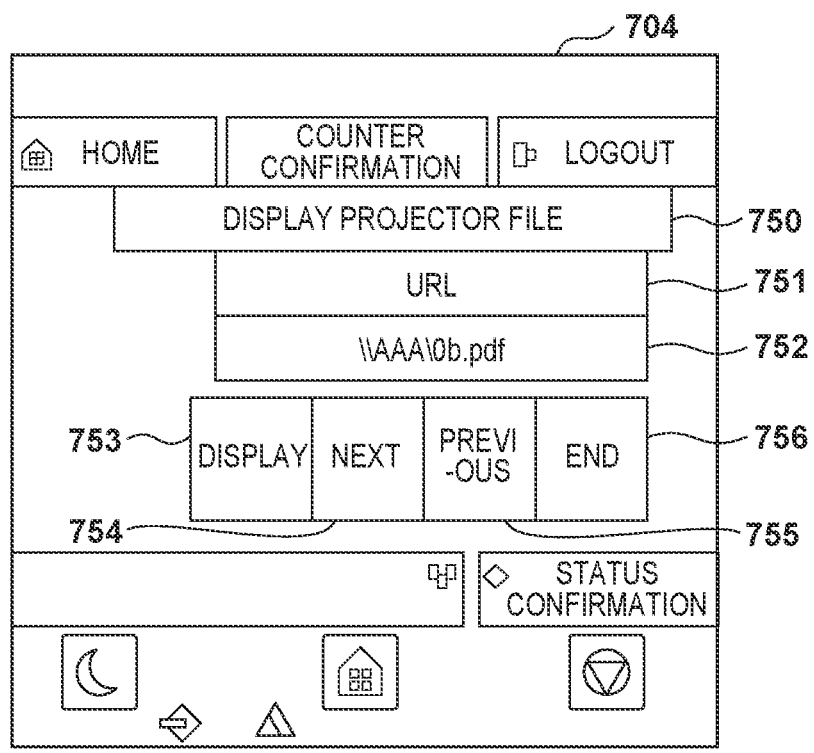
FIG. 7A5

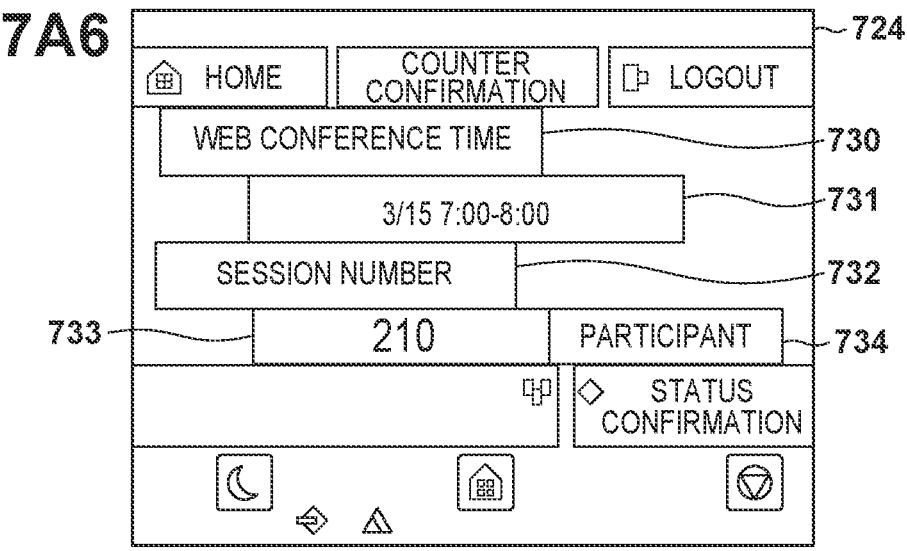

| JOB PRESENCE/ABSENCE | PRESENCE | 801 |
|---|---|---|
| NUMBER OF PAGES | 3 | 802 |
| COLOR FOR EACH PAGE | MONOCHROMATIC<br>COLOR<br>COLOR | 803 |

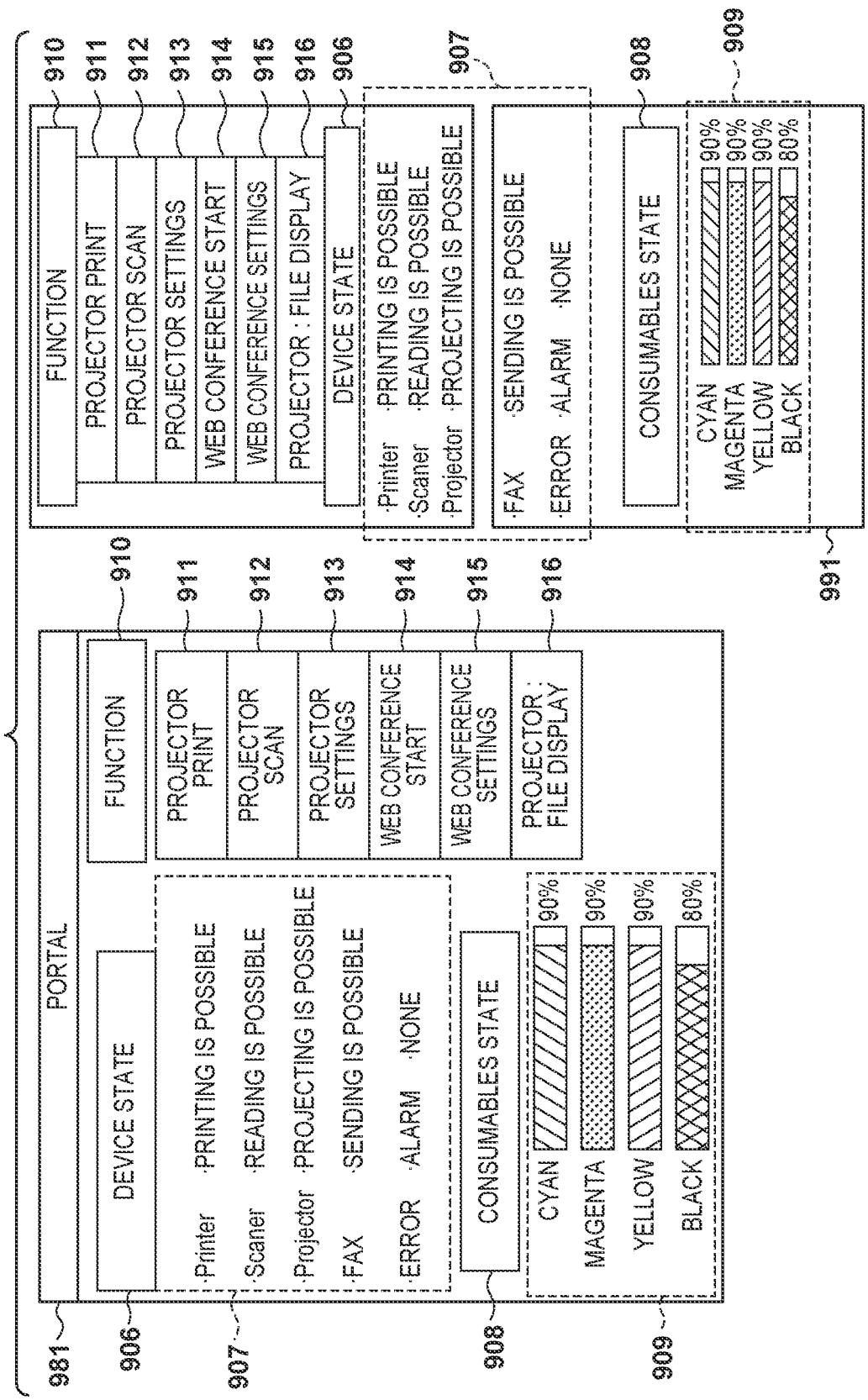
FIG. 9A2

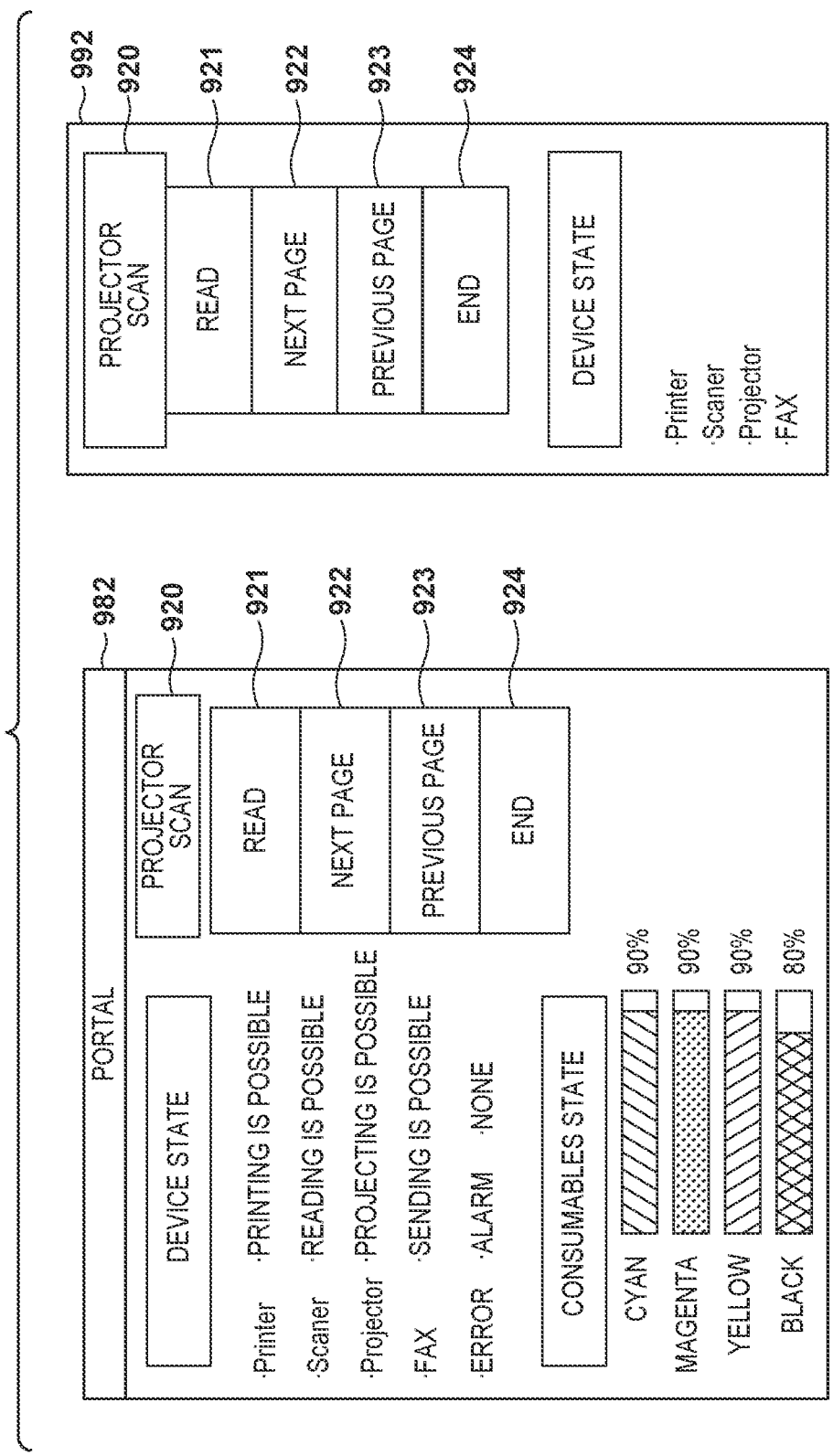

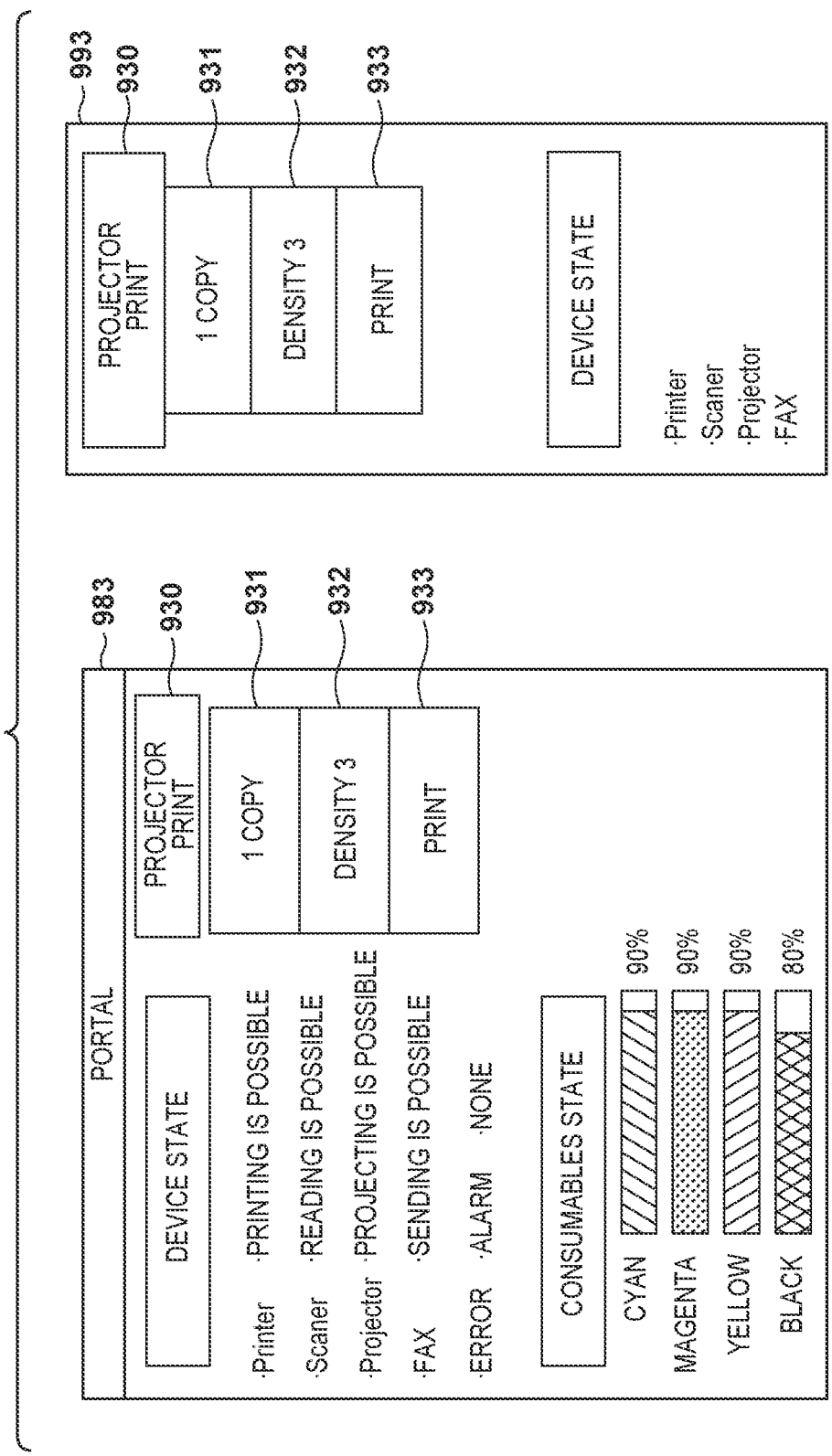

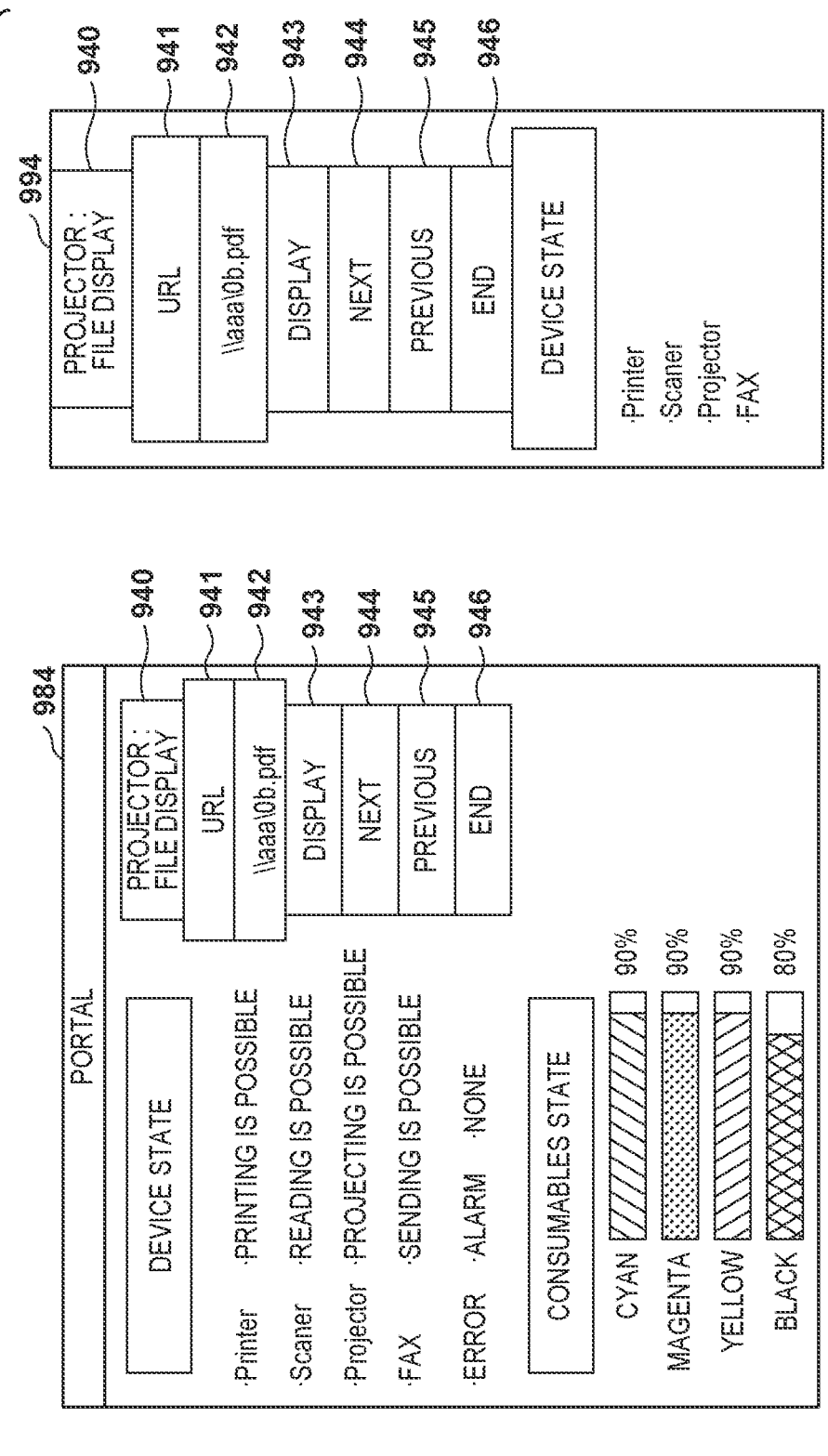
FIG. 9B1

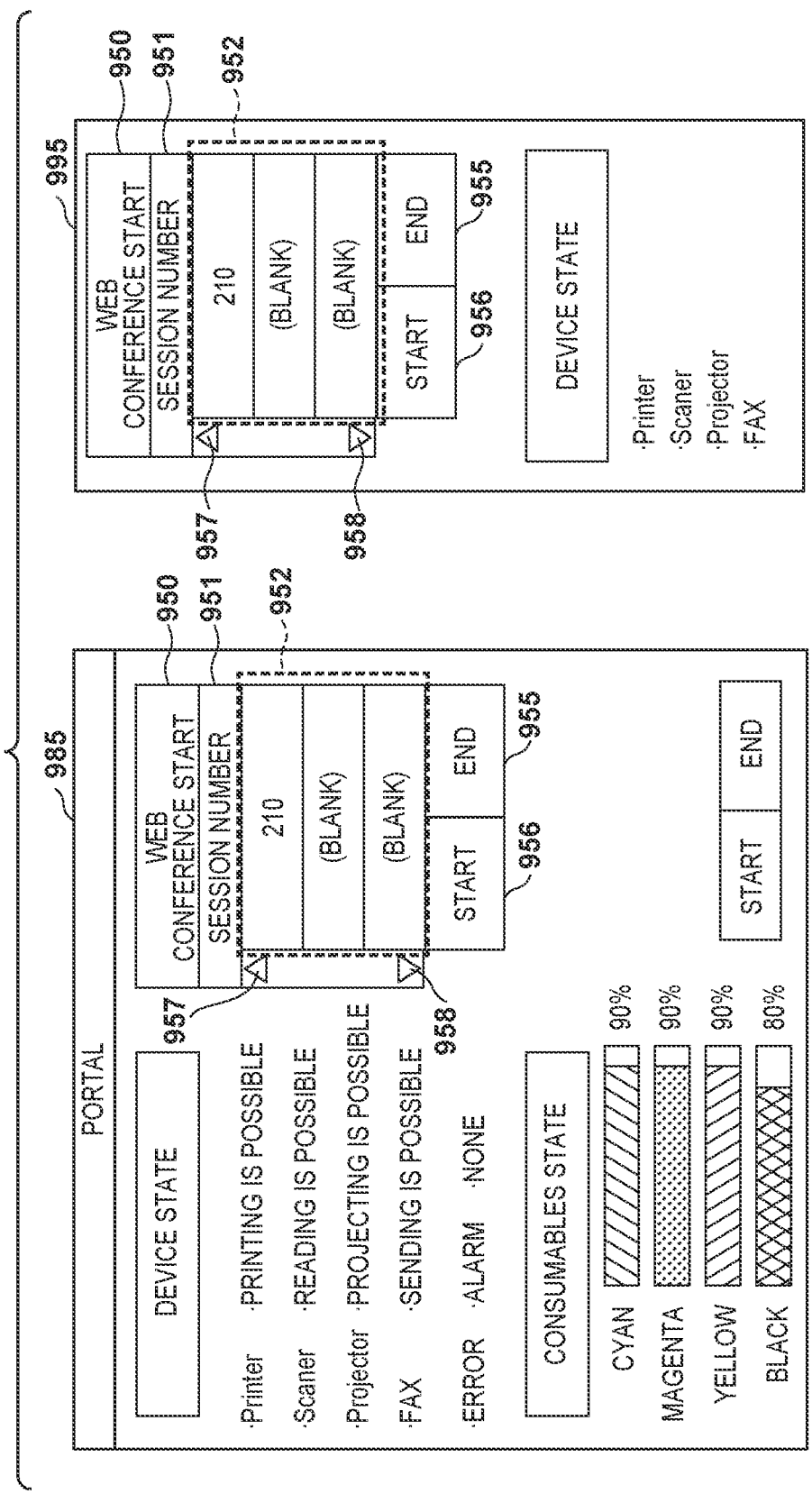

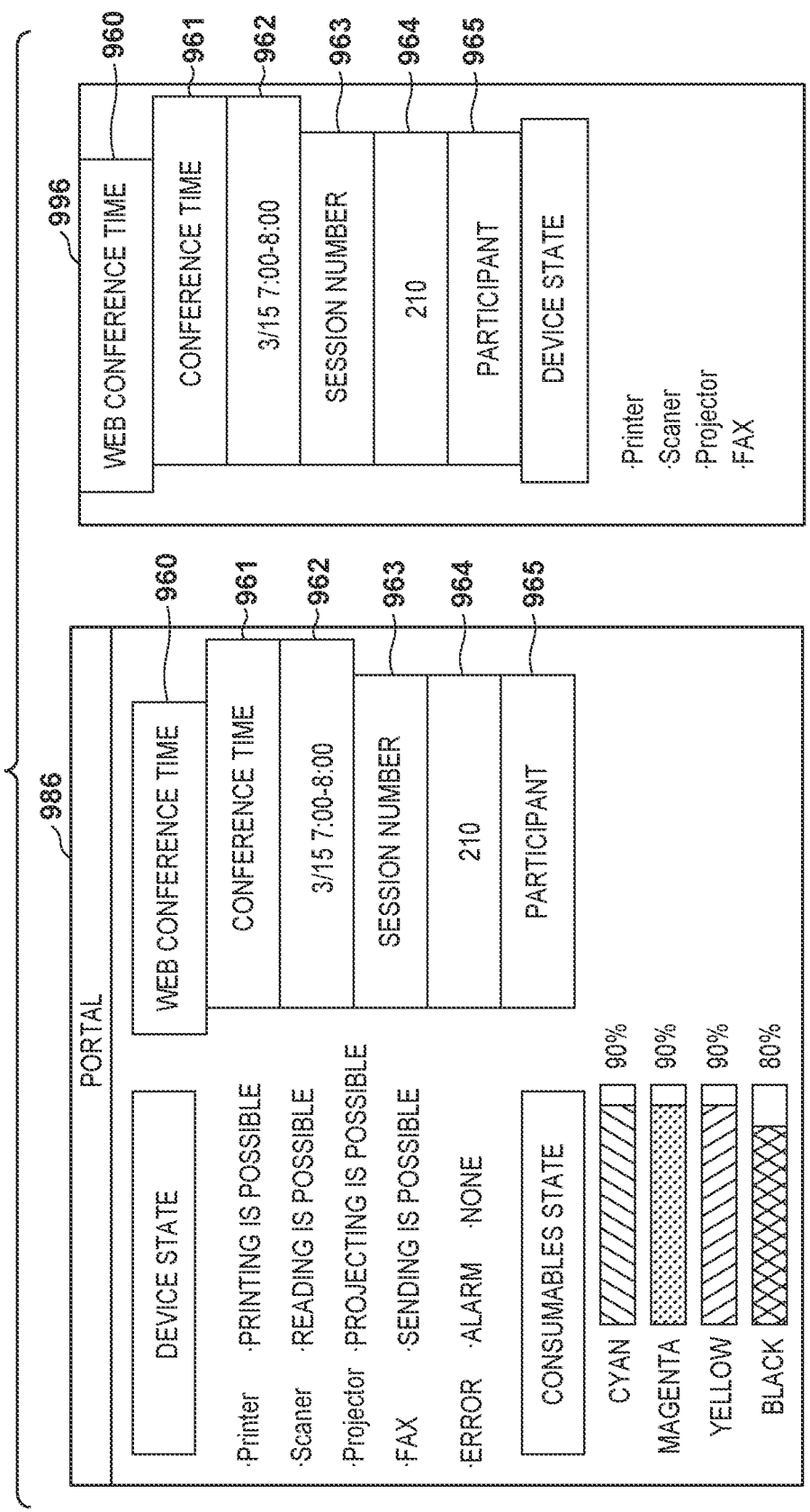

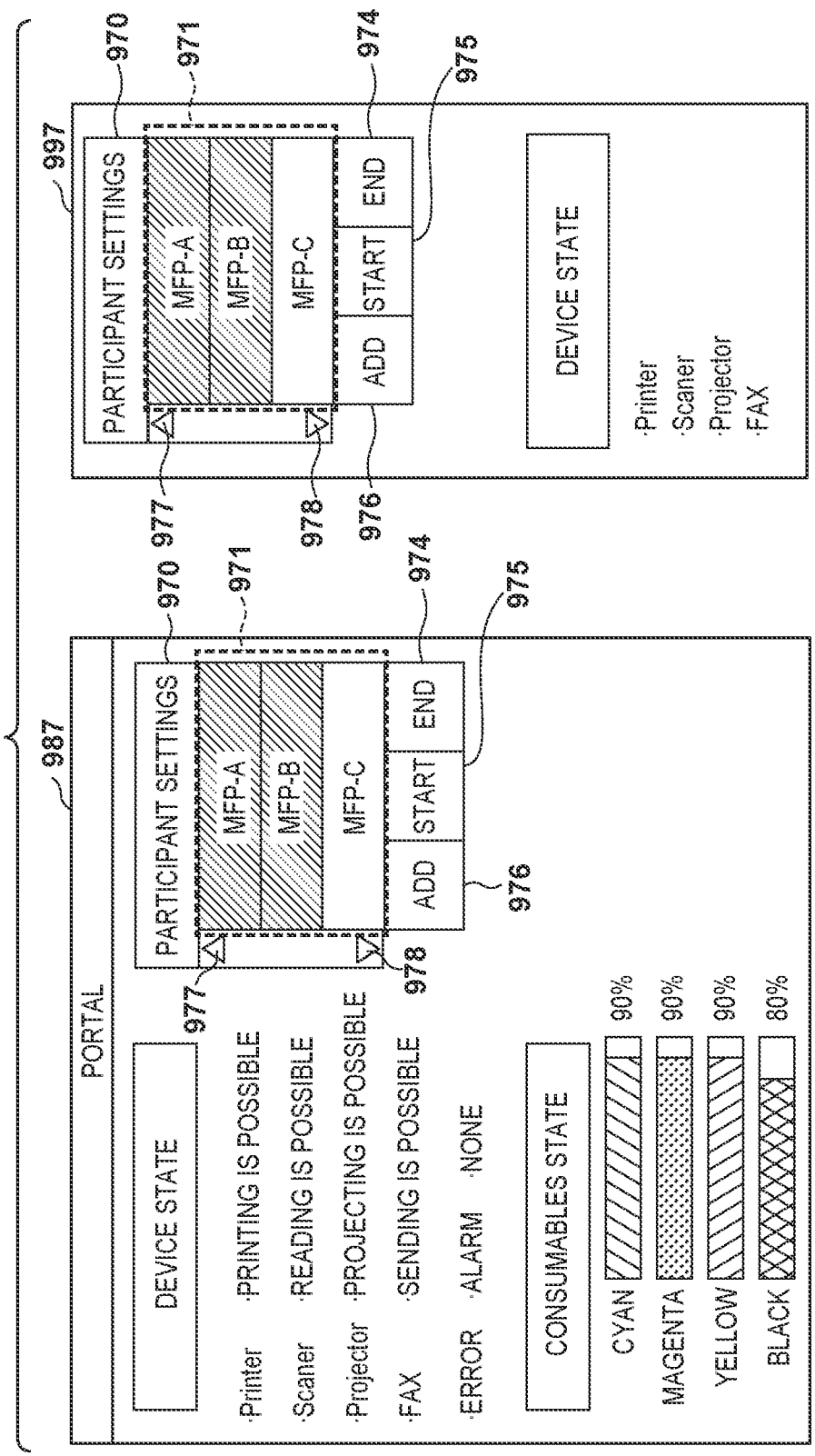
FIG. 9B4

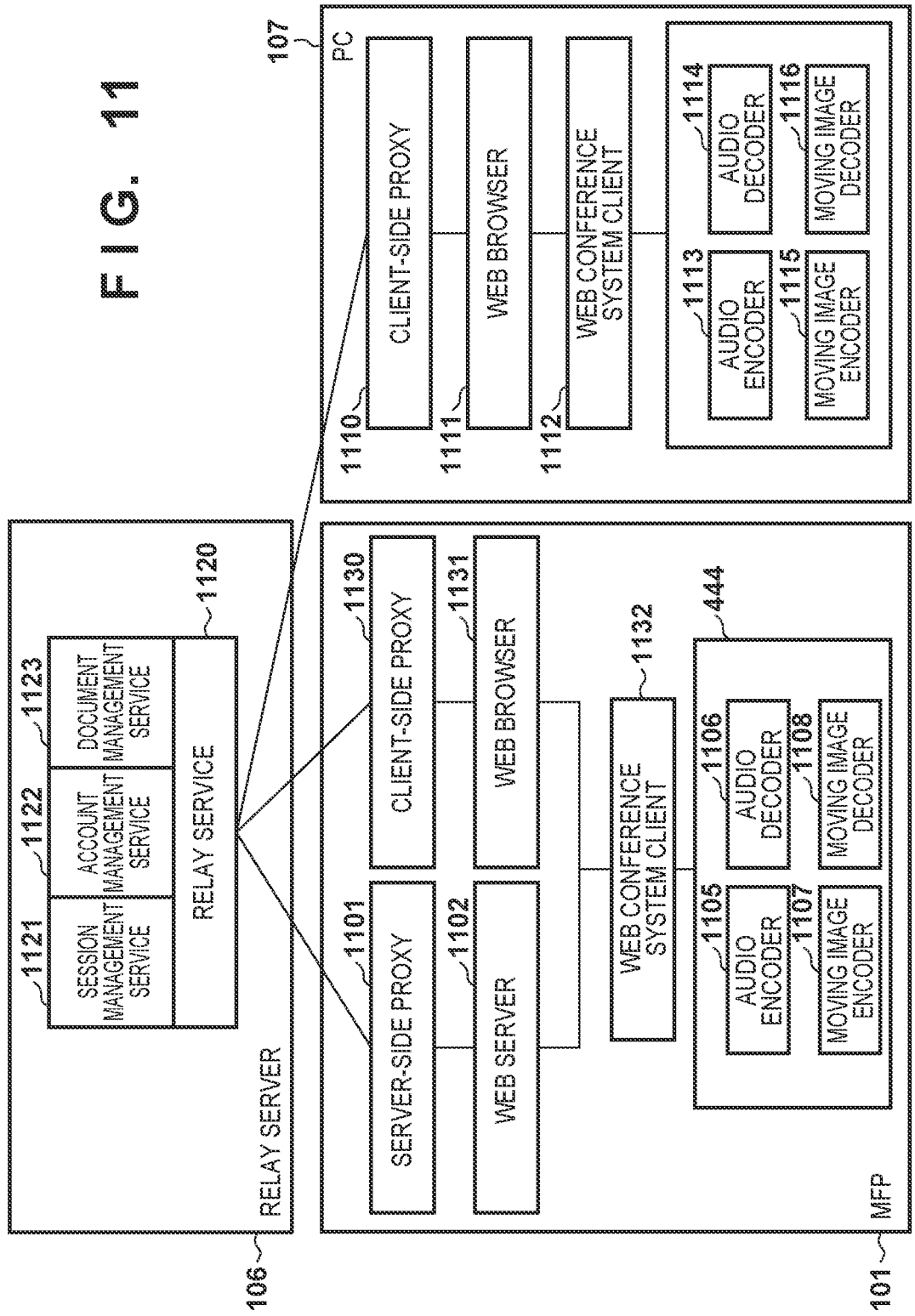

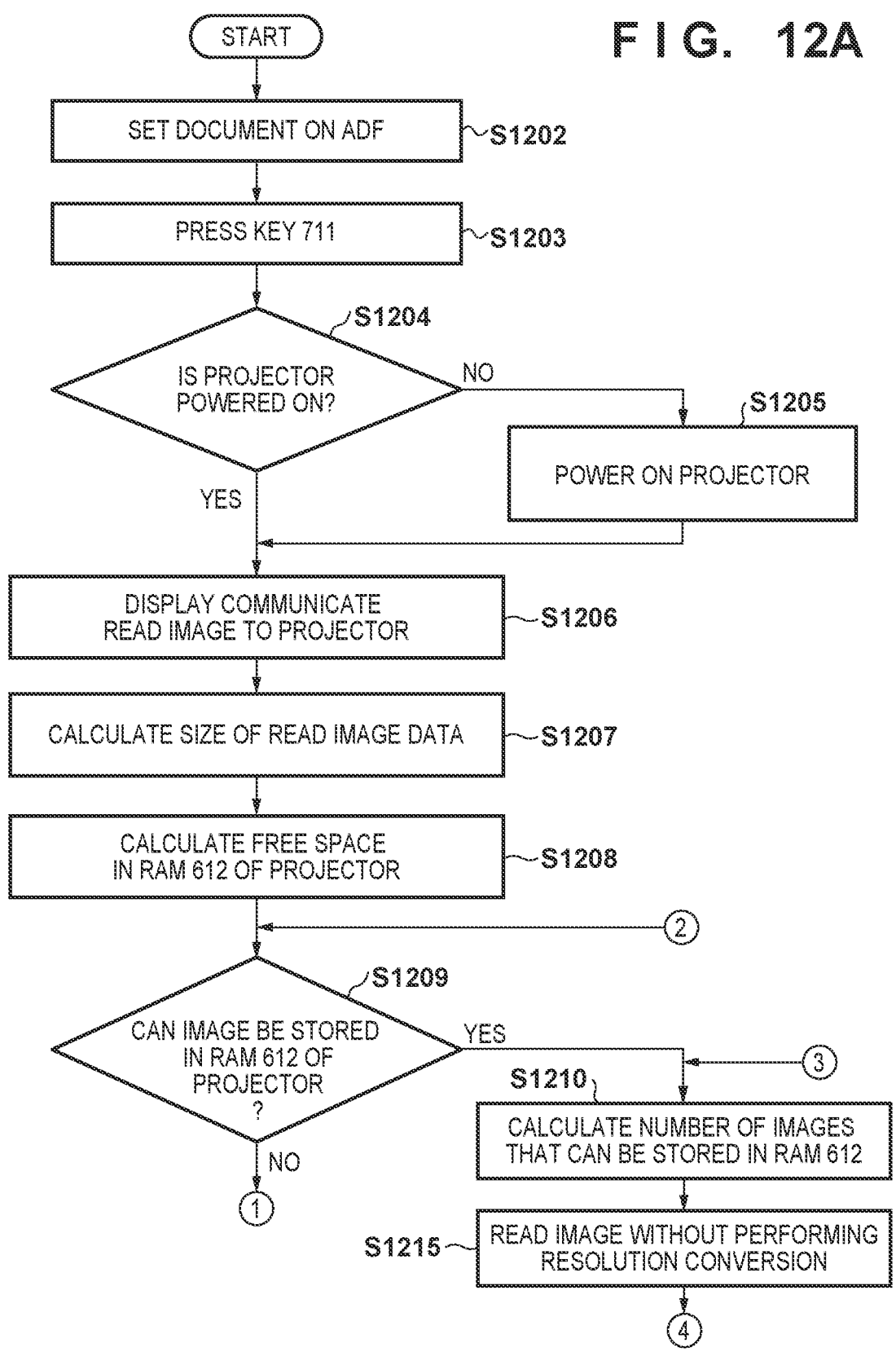

IMAGE PROCESSING APPARATUS, METHOD OF CONTROLLING THE SAME, AND STORAGE MEDIUM FOR PROJECTING A SCANNED IMAGE AND FOR PRINTING A PROJECTED IMAGE

BACKGROUND

Field of the Disclosure

The present disclosure relates to an image processing apparatus, a method of controlling the same, and a storage medium.

Description of the Related Art

In recent years, PCs have become increasingly widespread, and network-based advancements in IT are progressing as well. In such an environment, presentations are used to communicate business plans and the like, and applications which support such presentations are also becoming widespread. Presentations using projectors have therefore become the norm. This enables presentations to be made paperless, which reduces costs and prevents the proliferation of paper and the like.

Meanwhile, offices also have multifunction peripherals that perform paper-based office tasks such as copying, faxing, and printing. This sometimes serves as a countermeasure against physical threats such as instances where PCs or other infrastructure is misused through tampering or the like, PCs themselves are stolen or lost, and so on. There are also cases where original documents are created using procedures such as signing or stamping, as with official documents exchanged between companies, and paper documents are handled as well.

A projector and a multifunction peripheral are required to implement both, and as such, a location for both the projector and the multifunction peripheral is needed as well. Japanese Patent Laid-Open No. 2017-38242 proposes a configuration in which a projector and a multifunction peripheral are arranged vertically in three dimensions in order to save space.

However, this conventional technique has the following issue. For example, in a three-dimensional layout configuration such as in the conventional technique described above, the arrangement is such that there is no interference with other functions (the printer and the like), but the document makes no proposals for system operations which enable the provided functions to operate in combination with each other.

SUMMARY

A case is conceivable where these functions are operated in combination with each other during a presentation. Specifically, while projecting presentation materials input from a PC using a projector function, there are situations where a person wishes to print out the presentation materials being projected in order to write handwritten text on document materials in that person's possession. In addition, there are times when a person wishes to write text by hand on document materials in that person's possession and display an image read from the document on the projector as-is in order to update the projected content. If such a function could be realized, it would be possible to take flexible actions during a presentation, such as printing projected content as needed, revising the projected content by reading a handwritten document in order to revise the projected content, and the like. On the other hand, until now, such functions have required complicated operations from the user, such as multiple exchanges of information between the PC and the image processing apparatus, making it difficult to realize such functions during a presentation.

Embodiments of the present disclosure enable realization of a system for projecting an image scanned from a document by a projector according to a simple operation made by a user. Embodiments of the present disclosure also provide a mechanism for printing content projected by a projector according to a simple operation made by a user.

Some embodiments of the present disclosure provide an image processing apparatus comprising: a reader that reads an image from a document; a projection unit that projects an image; a printer that prints an image onto a sheet; an operation unit that accepts a first instruction for the projection unit to project the image read by the reader and a second instruction for the printer to print the image projected by the projection unit; and a control unit, wherein in a case where the first instruction is accepted by the operation unit, the control unit causes the projection unit to project the image read by the reader, and in a case where the second instruction is accepted by the operation unit, the control unit causes the printer to print the image being projected by the projection unit.

Some embodiments of the present disclosure provide a method of controlling an image processing apparatus, the image processing apparatus including a reader that reads an image from a document, a projection unit that projects an image, and a printer that prints an image onto a sheet, the method comprising: accepting a first instruction for the projection unit to project the image read by the reader and a second instruction for the printer to print the image projected by the projection unit; in a case where the first instruction is accepted in the accepting, causing the projection unit to project the image read by the reader; and in a case where the second instruction is accepted in the accepting, causing the printer to print the image being projected by the projection unit.

Some embodiments of the present disclosure provide a non-transitory computer-readable storage medium storing a computer program for causing a computer to execute a method of controlling an image processing apparatus, the image processing apparatus including a reader that reads an image from a document, a projection unit that projects an image, and a printer that prints an image onto a sheet, the method comprising: accepting a first instruction for the projection unit to project the image read by the reader and a second instruction for the printer to print the image projected by the projection unit; in a case where the first instruction is accepted in the accepting, causing the projection unit to project the image read by the reader; and in a case where the second instruction is accepted in the accepting, causing the printer to print the image being projected by the projection unit.

Further features of the present disclosure will be apparent from the following description of exemplary embodiments with reference to the attached drawings.

BRIEF DESCRIPTION OF THE DRAWINGS

FIG. 4B is a diagram illustrating an image packet structure according to an embodiment.

FIG. 4D is a diagram illustrating a printer image processing unit 432 according to an embodiment.

FIGS. 7A1-7A8 are a diagram illustrating a screen displayed in an operation unit 250 according to an embodiment.

FIG. 8 is a diagram illustrating job information used by the control system of the printer function unit 202 according to an embodiment.

FIGS. 9A1-9A4 are a diagram illustrating a remote operation unit according to an embodiment.

FIGS. 9B1-9B4 are a diagram illustrating a remote operation unit according to an embodiment.

FIG. 11 is a diagram illustrating an example of the functional configuration of each of apparatuses according to the embodiment.

FIGS. 12A-12B are a flowchart illustrating reading an image using the reader function unit 201 and displaying the image using a projector 204, according to the embodiment.

DESCRIPTION OF THE EMBODIMENTS

Figure 1:
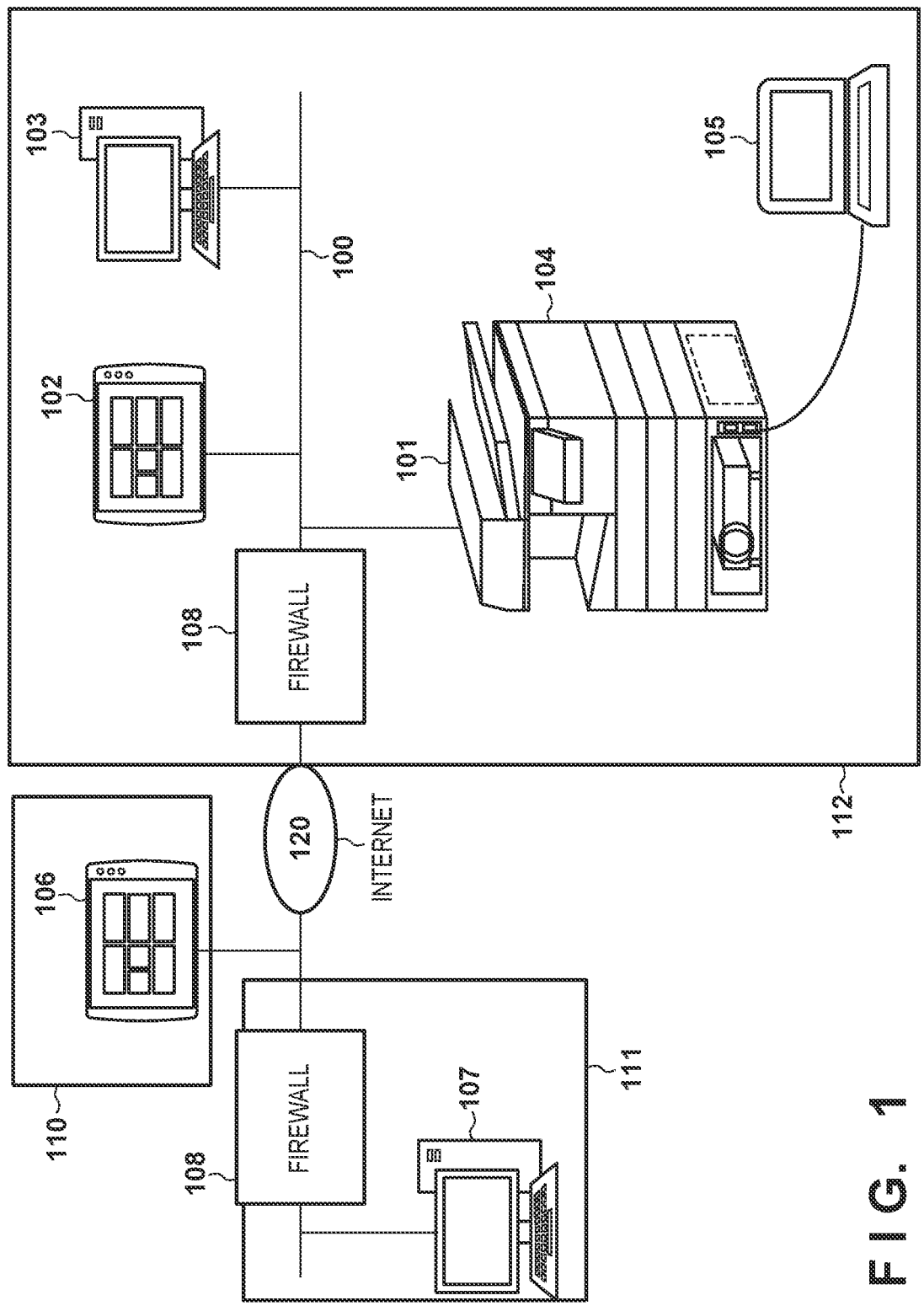
FIG. 1 is a diagram illustrating a system configuration according to an embodiment.

Hereinafter, embodiments will be described in detail with reference to the attached drawings. Note, the following embodiments are not intended to limit the scope of the disclosure. Multiple features are described in the embodiments, but limitation is not made to require all such features, and multiple such features may be combined as appropriate. Furthermore, in the attached drawings, the same reference numerals are given to the same or similar configurations, and redundant description thereof is omitted.

First Embodiment

System Hardware Configuration

An embodiment of the present disclosure will be described hereinafter. First, an example of a system configuration according to the present embodiment will be described with reference to FIG. 1. This system is constituted by a server group 110, a user environment 111 of a web conferencing system, and a user environment 112 of an image processing system. These environments are connected to each other via the Internet 120 to be capable of sending and receiving information. The user environment 112 of the image processing system includes a full-color MFP 101, which uses the electrophotographic method, as an example of an image processing apparatus, a file server 102, and a personal computer (PC) 103. The apparatuses are communicatively connected to each other over a network 100, and are connected to the Internet 120 via a firewall 108. The present embodiment will describe a full-color MFP as an example, but an MFP that reads in color but prints in black-and-white, or an MFP that both reads and prints in black-and-white, can be applied as well. In this manner, any MFP can be applied, and will therefore be referred to simply as the MFP 101 hereinafter.

The MFP 101 includes copy, fax, and printer functions. The MFP 101 further has a "send" function for sending an image file scanned by a reader function unit 201 to a computer device, as well as an IFAX function for communicating an image scanned by a scanner between devices of the same type and printing the received image. The PC 103, which is an external apparatus, uses a printer driver to convert a file generated by an application on the PC and sends the file to a printer function unit 202 of the MFP 101, where the image is formed on a storage medium. The file server 102, which stores data, stores other files generated by the PC 103, files generated by another PC (not shown), and so on. The PC 103 can also send a file on the file server 102 to the MFP 101 and cause an image to be formed on a storage medium. The file server 102 and the MFP 101 use the SMB protocol, the WebDAV protocol, or the like for file sharing. SMB is an acronym of "Server Message Block". WebDAV stands for "Web-based Distributed Authoring and Versioning". The MFP 101 uses a facsimile protocol to send read image data read from a document by the reader function unit 201 to a public line 104. The MFP 101 also transfers image data received from the public line 104 to the printer function unit 202 and causes an image to be formed on a storage medium.

The web conferencing system is constituted by a relay server 106 of the server group 110, as well as web conferencing system clients 1132 and 1112 included in the MFP 101, a PC 107, and the like installed in the user environments 111 and 112. A web conference can be conducted by connecting each of these components over the Internet. A plurality each of the PC 107, the relay server 106, and the MFP 101 may be installed. Additionally, although FIG. 1 illustrates the MFP 101 as being located in the user environment 112, another information processing apparatus may be located there as well. Here, the "other information processing apparatus" may be, for example, a PC, a server apparatus, a tablet terminal, or the like. The firewall 108 provided in the user environment 112 is configured to permit terminals inside the user environment 112 to connect to the Internet 120, but prohibit connections to the terminals inside the user environment 112 from the Internet 120 side.

The server group 110 is a server group constituted by server computers which provide services over the Internet 120, and may be one or more server computers. FIG. 1 illustrates the server group 110 as being constituted only by the one relay server 106. The relay server 106 is an example of an information processing apparatus.

Projector Expansion Unit

Figure 2:
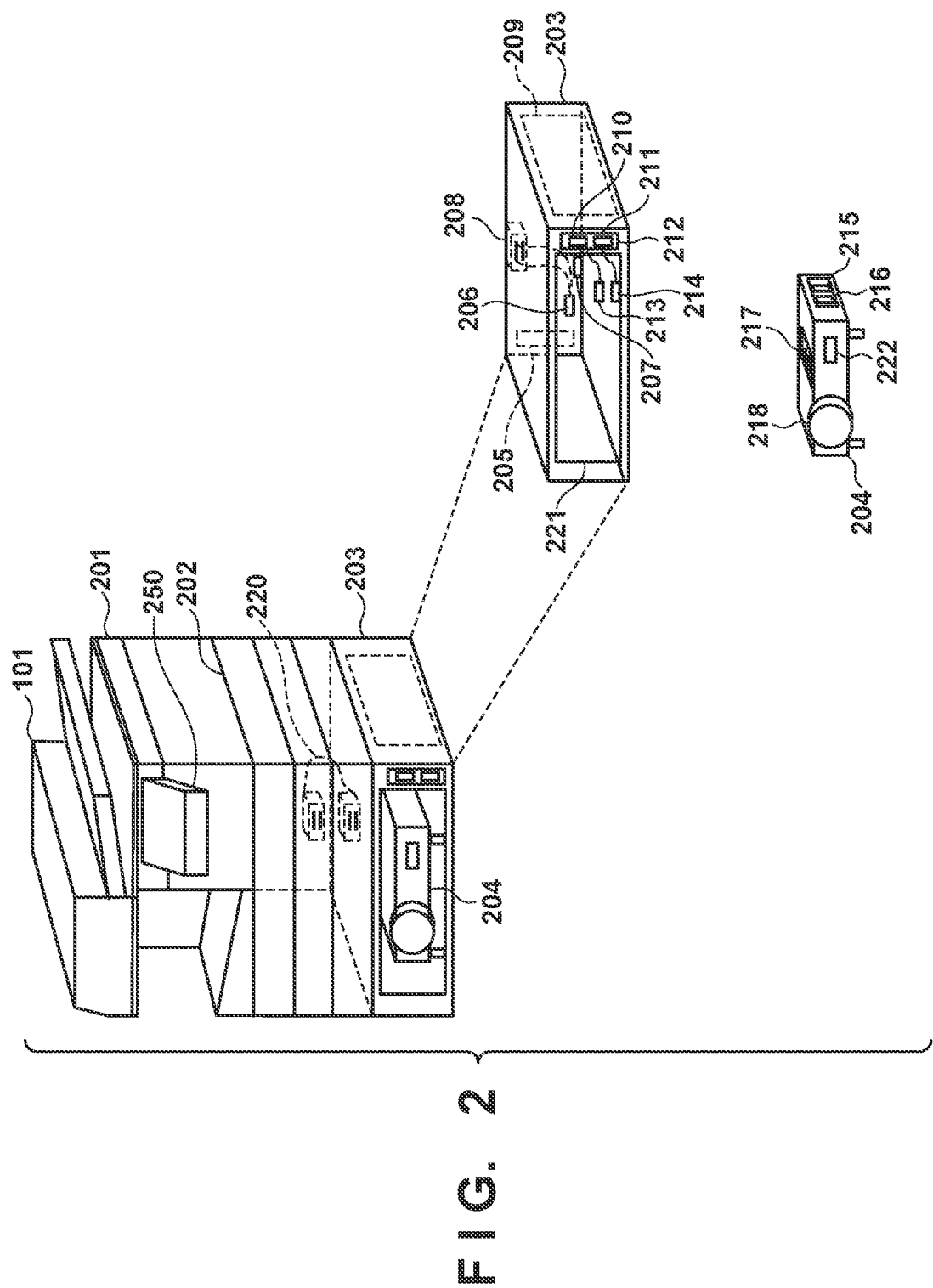
FIG. 2 is a diagram illustrating the installation of a projector expansion unit 203 according to an embodiment.

A projector expansion unit 203 provided in the MFP 101 according to the present embodiment will be described next with reference to FIG. 2. As illustrated in FIG. 2, the MFP 101 is configured including the reader function unit 201 which reads an image from a document, the printer function unit 202 which forms images, and the projector expansion unit 203. The projector expansion unit 203 is connected to the printer function unit 202. In the projector expansion unit 203, a projector (projection unit) 204 is installed within a front cutout 221 when the front cutout 221 is in an open state, as illustrated in FIG. 2. A right-side cutout opening 209 may also be provided in the projector expansion unit 203. Likewise, the projector 204 may be installed with a rear cutout or a left-side cutout (not shown) provided as well. However, it is preferable that a cutout be provided only one location, and that when a plurality of cutouts are provided, the cutouts which are not being used are covered by a cover member or the like. In this manner, the MFP 101 according to the present embodiment has a built-in projector 204, and as illustrated in FIG. 2, the configuration may be such that the projector 204 and the reader function unit 201, the printer function unit 202, and the like are arranged vertically in a three-dimensional manner. Additionally, embodiments of the present disclosure can also be applied in another configuration, such as one in which the units are arranged horizontally, and the projector 204 may furthermore be provided so as to be movable.

A cutout 212 is a cutout for external input I/F installation on a front side, a cutout 205 is a cutout for external input I/F installation on a rear side, and the cutouts are regions for installing connector units which connect an external input I/F to the projector 204. The external input I/F is provided with connectors for HDMI (registered trademark) (High Definition Multimedia Interface) 210, a projector external input I/F (D-sub) 211, and so on. The cutout 212 or the cutout 205 may be selectively provided depending on the installation situation. A D-sub connector 215 of the projector 204 is connected to a projector external input connector (D-sub) 214 connected from the projector external input I/F (D-sub) 211. An HDMI connector 216 of the projector 204 is connected to a projector external input connector (HDMI) 213 connected from the projector external input I/F (HDMI) 210.

When having the projector 204 project an image of an application displayed in a PC 105, a D-sub connector of the PC 105 is connected to the projector external input I/F (D-sub) 211 using a D-sub cable. This makes it possible to display an image in the projector 204 by outputting the image from the PC 105. When connecting from the PC 105 using HDMI, an image of the PC 105 can be displayed by making the connection using the projector external input I/F (HDMI) 210. On the other hand, when connecting the projector 204 to the PC 105 over WiFi, computer images are input from the PC 105 through a wireless antenna 442 connected to a controller unit 400 of the MFP 101 and a wireless LAN 441 (described later).

The projector expansion unit 203 is connected to the printer function unit 202 using an expansion function cable 220 extended from the rear side of the printer function unit 202 of the MFP 101. The expansion function cable 220 is constituted by two types of cables, namely a projector control cable 206 and a projector projection image cable 207. The expansion function cable 220 is connected to an MFP connection connector 208 of the projector expansion unit 203 and is input to the built-in projector control unit illustrated in FIG. 6. The projector control unit in FIG. 6 determines the signals flowing in the projector control cable 206 and the projector projection image cable 207 input from the MFP 101, and outputs an image signal to the projector 204.

The signals flowing in the projector control cable 206 and the projector projection image cable 207 connected to the MFP connection connector 208 are generated by the controller unit 400 illustrated in FIG. 4. The reader function unit 201 and the printer function unit 202 are connected to the controller unit 400, and the reader function unit 201, the printer function unit 202, and an operation unit 250 for operating and issuing control instructions to the projector expansion unit 203 are connected to the controller unit 400. When a key 711 illustrated in FIG. 7A1 is operated in the operation unit 250, the projector expansion unit 203 operates according to control commands sent from the controller unit 400 over the projector control cable 206. Furthermore, the projector expansion unit 203 projects the image signal sent over the projector projection image cable 207 using the projector 204. On the other hand, when a key 712 illustrated in FIG. 7A2 is operated, image data is set to the printer function unit 202 over the projector projection image cable 207 and an image is formed on a storage medium, in accordance with control commands sent from the controller unit 400 over the projector control cable 206. A projector power key 222 is a key that can turn on the projector 204, and even when the MFP 101 is turned off, it is possible to use the projector 204 alone by turning on the projector power key 222.

Reader Function Unit and Printer Function Unit

Figure 3:
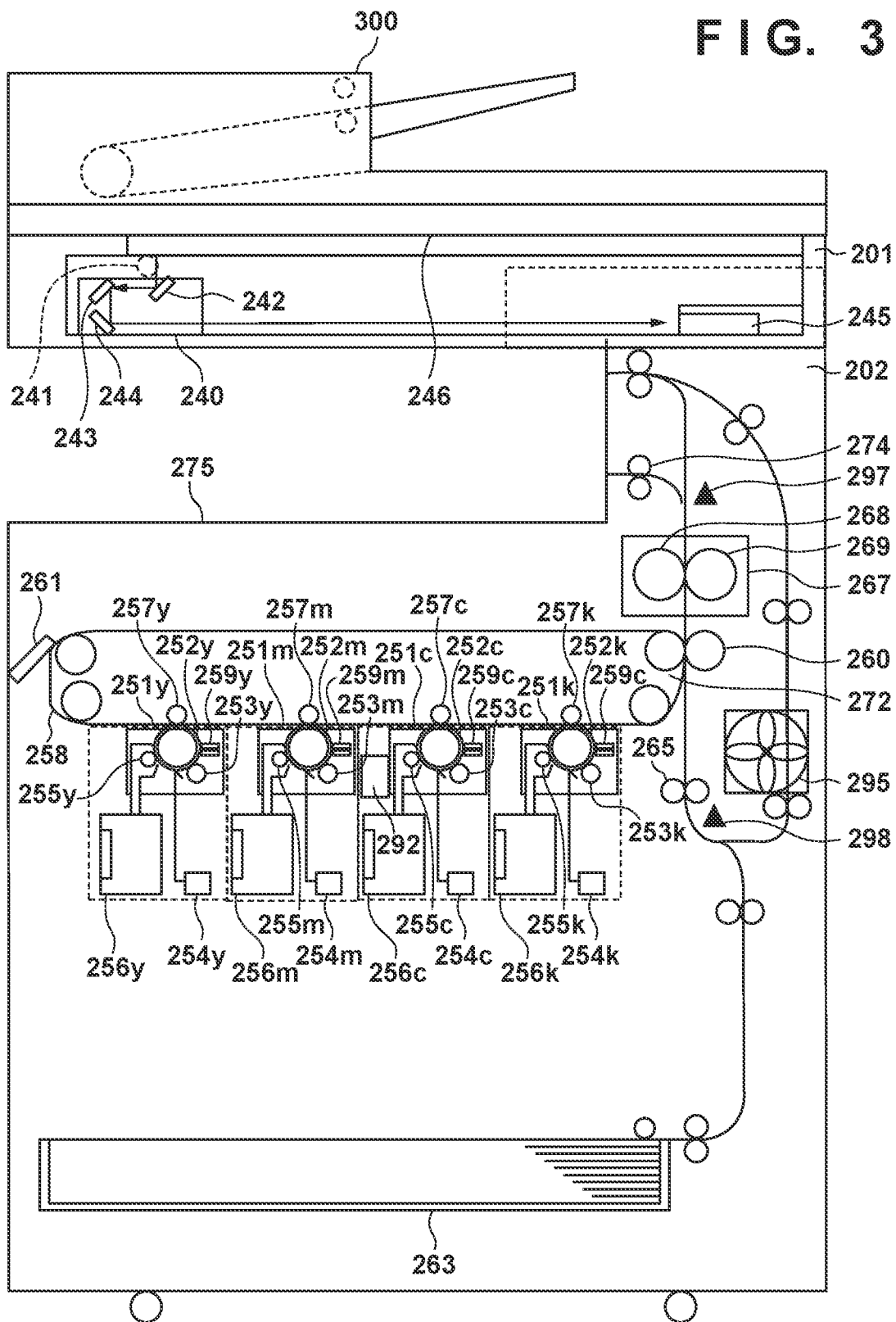
FIG. 3 is a diagram illustrating a reader function unit 201 and a printer function unit 202 according to an embodiment.

The reader function unit 201 and the printer function unit 202 according to the present embodiment will be described next with reference to FIG. 3.

The reader function unit 201 will be described first. A document loaded in a document feeding apparatus 300 is sequentially conveyed one sheet at a time onto a document platform glass surface 246. When the document is conveyed to a predetermined location of the document platform glass surface 246, a lamp 241 of a scanner unit 240 turns on, and the scanner unit 240 moves to irradiate the document with light. Reflected light from the document enters a CCD image sensor unit 245 (called a "CCD" hereinafter) via mirrors 242, 243, and 244.

The printer function unit 202 will be described next. The printer function unit 202 is provided with process units 251y, 251m, 251c, and 251k, which are arranged in a straight line substantially horizontally at regular intervals. The process units 251y, 251m, 251c, and 251k form toner images using yellow (y), magenta (m), cyan (c), and black (k) developing agents, respectively. The toner images formed by the process units 251y, 251m, 251c, and 251k undergo primary transfer to an intermediate transfer belt 258 that comes into contact with those images. Then, the toner images of each color superimposed on the intermediate transfer belt 258 are conveyed and transferred onto paper, which is synchronized by a resist roller 265 (described later), at a nip where a drive roller 272 and a secondary transfer roller 260 come into contact with each other. Each of the process units 251y, 251m, 251c, and 251k includes a photosensitive drum 252, a charging roller 253, a laser exposure apparatus 254, a developer 255, a toner receptacle 256, and an auxiliary charging brush 259. In FIG. 1, the symbols y, m, c, and k are added to the end of each reference sign to indicate the respective colors.

The printer function unit 202 also includes primary transfer rollers 257y, 257m, 257c, and 257k, the intermediate transfer belt 258, the secondary transfer roller 260, a transfer cleaning apparatus 261, a paper feed cassette 263, and the resist roller 265. The printer function unit 202 also includes a fixing apparatus 267, the drive roller 272, a pre-resist conveyance sensor 298, and a conveyance sensor 297. The fixing apparatus 267 includes a fixing roller 268 and a pressure roller 269. The operations of these components will be described later.

Control Configuration of Printer Function Unit 202

Figure 5:
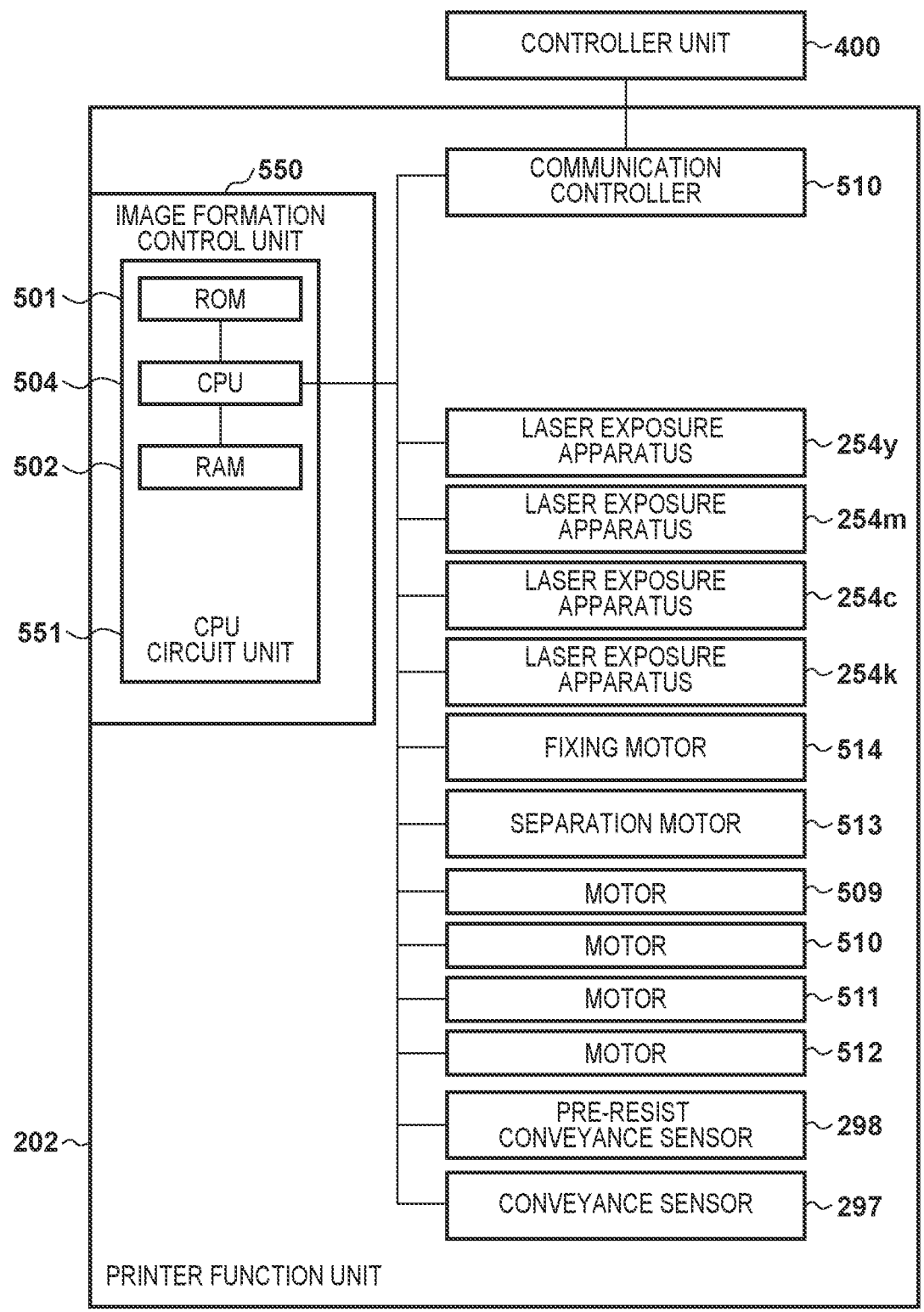
FIG. 5 is a diagram illustrating a control system of the printer function unit 202 according to an embodiment.

A configuration pertaining to control of the printer function unit 202 according to the present embodiment will be described next with reference to FIG. 5. The printer function unit 202 mainly includes a communication controller 510, an image formation control unit 550, and loads 254, 297, 298, and 509 to 512. The image formation control unit 550 includes a CPU circuit unit 551 constituted by a CPU 504, ROM 501, and RAM 502 for controlling each load involved in image formation.

In image formation operations, first, the communication controller 510 receives an instruction to start image formation from the controller unit 400, and communicates that instruction to the CPU circuit unit 551. Upon receiving the instruction to start image formation, the CPU circuit unit 551 acquires data of job information. The content of the job information will be described later with reference to FIG. 8. The CPU circuit unit 551 then stores the job information in the RAM 502 and executes a program stored in the ROM 501. Then, the CPU circuit unit 551 controls the laser exposure devices 254y, 254m, 254c, and 254k, motors 509 to 512, a separation motor 513, and a fixing motor 514 in order to execute the image formation operations described below.

The motor 512 is a motor that drives the photosensitive drum 252k and the developer 255k. Like the motor 512, the motors 509 to 511 are motors that drive the photosensitive drums 252y, 252m, and 252c and the developers 255y, 255m, and 255c, respectively. The separation motor 513 is a motor for controlling the contact and separation of the intermediate transfer belt 258 and the process units 251y, 251m, 251c, and 251k. The fixing motor 514 is a motor that drives the fixing roller 268 and the pressure roller 269. When the image formation operations end, the CPU circuit unit 551 deletes the job information that had been stored in the RAM 502.

Controller Unit

Figure 4A:
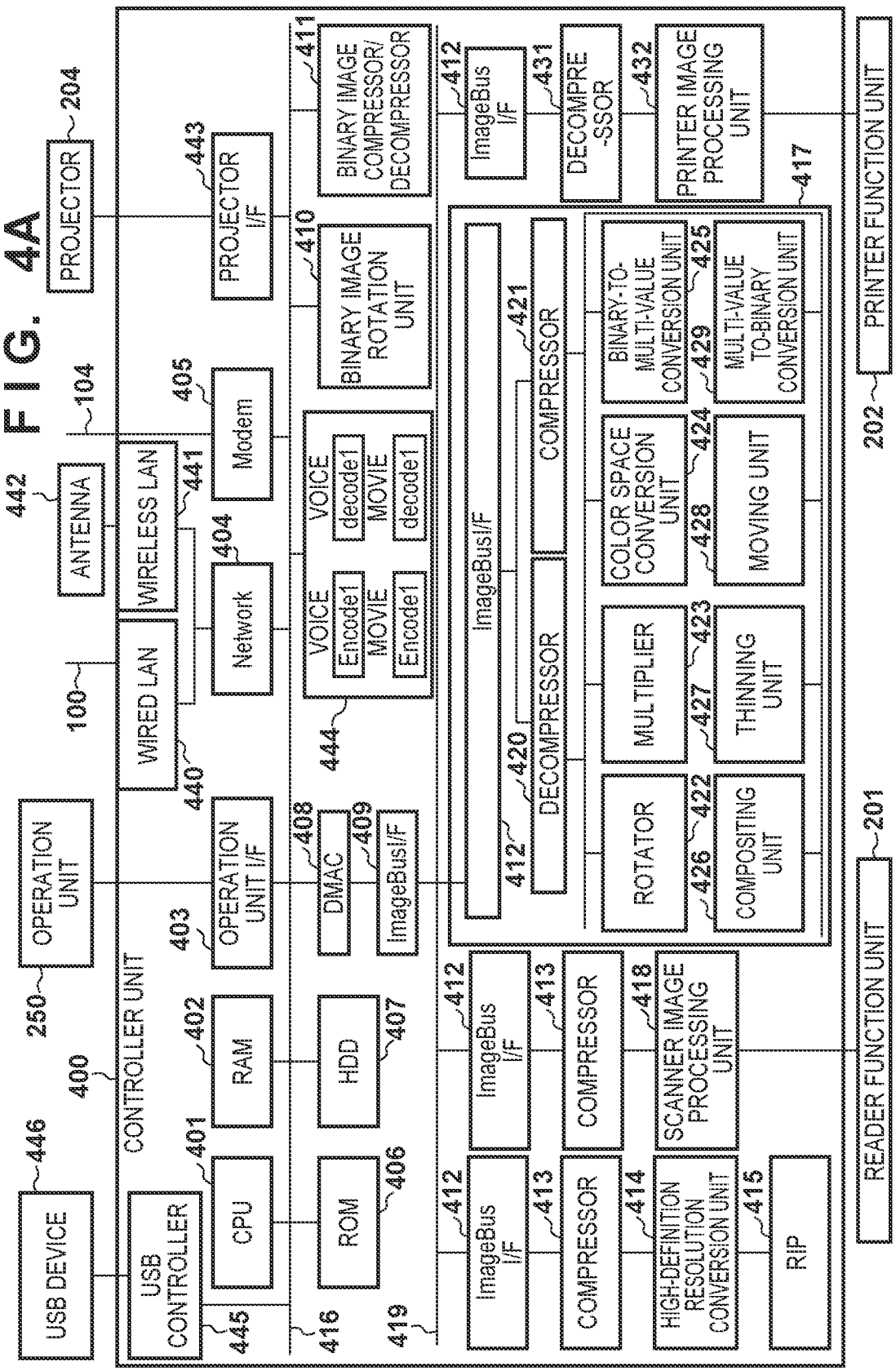
FIG. 4A is a diagram illustrating a controller unit 400 according to an embodiment.

A control configuration of the MFP 101 according to the present embodiment (the controller unit) will be described next with reference to FIG. 4A. As described with reference to FIG. 2, the MFP 101 includes the reader function unit 201, which is an image input device, the printer function unit 202, which is an image output device, the controller unit 400, and the operation unit 250, which is a user interface. The reader function unit 201, the printer function unit 202, and the operation unit 250 are connected to the controller unit 400, and the controller unit 400 is connected to a network transmission unit such as a LAN 100, the public line 104, and the like. Transmission by G3 and G4 faxes, including color image transmission, is possible from the public line. The PC 103 is also connected over the LAN 100 and can send and receive files using the FTP and SMB protocols, and send and receive emails.

The controller unit 400 is connected to the reader function unit 201, which is an image input device, and the printer function unit 202, which is an image output device. On the other hand, the controller unit 400 is also connected to the LAN 100, a public network (WAN) 104, and the like, and can also input and output image information, device information, and the like. The components (devices) included in the controller unit 400 will be described here. A CPU 401 is a controller that controls the system as a whole. RAM 402 is system work memory used for operations by the CPU 401, and is also image memory that temporarily stores image data. ROM 406 is boot ROM, and holds a system boot program. An HDD 407 is a hard disk drive, and stores system software, image data, and the like. An operation unit I/F 403 is an interface unit with the operation unit (UI) 250, and outputs, to the operation unit 250, image data to be displayed in the operation unit 250. The operation unit I/F 403 also plays a role of conveying the information manipulated by a user of the system from the operation unit 250 to the CPU 401. A LAN circuit 404 is connected to a wired LAN 440 and the wireless LAN 441, and the wired LAN 440 connects to an external network via the LAN 100 and inputs and outputs information. The wireless LAN 441 connects to the wireless antenna 442 and inputs and outputs information. A modem 405 connects to the public line 104 and inputs and outputs image information. A binary image rotation unit 410 and a binary image compressor/decompressor 411 are used to convert the orientation of a binary image before the image is sent by the modem 405, to convert the image to a predetermined resolution or a resolution that matches the capabilities on the partner side, and so on. The compression and decompression support JBIG, MMR, MR, and MH. A DMAC 408 is a DMA controller that reads images stored in the RAM 402 without going through the CPU 401 and transfers images to an image bus I/F 409. Alternatively, the DMAC 408 writes images from the image bus I/F 409 to the RAM 402 without going through the CPU 401. A projector I/F 443 is connected to the projector 204, and causes images to be projected by inputting image signals to the projector 204. 444 indicates a component that includes encoders and decoders used for audio and moving images for web conferencing. This will be described in detail later with reference to FIG. 11. The aforementioned devices are connected to a system bus 416.

The controller unit 400 further includes the following components. At least one image bus I/F 412 is an interface for controlling high-speed image input and output via an image bus 419. Each of compressors 413 connected to a corresponding image bus I/F 412 is used for JPEG compression in units of 32×32 pixels before sending the image to the image bus 419. A decompressor 431 connected to the image bus I/F 412 is a decompressor for decompressing images sent over the image bus 419.

A raster image processor (RIP) 415 expands the PDL code from the host computer into a bitmap image (multi-value). Specifically, the CPU 401 first stores the PDL code received via the LAN circuit 404 in the RAM 402 through the system bus 416. The CPU 401 converts the PDL to intermediate code and inputs the intermediate code into the RIP 415 again via the system bus 416, where the intermediate code is expanded into a bitmap image (multi-value) by the RIP 415. In the present embodiment, the RIP 415 decompresses the intermediate code into a 1,200 dpi bitmap image. Then, a high-definition resolution conversion unit 414 reduces the resolution of the image data. In the present embodiment, 1,200 dpi data is converted to a 600 dpi signal. This enables conversion to 600 dpi data while retaining phase information of a 1,200 dpi image, and details of this will be given later. In other words, the output is processed to have the expressive power of a 1,200 dpi resolution level even if the output is 600 dpi, for characters (fonts) and line proportions.

A scanner image processing unit 418 performs various types of appropriate image processing (e.g., correction, processing, and editing) on color images, black-and-white images, and so on from the reader function unit 201, and outputs the results (multi-value). Likewise, a printer image processing unit 432 performs various types of appropriate image processing (e.g., correction, processing, and editing) for the printer function unit 202, and outputs the results. During printing, the decompressor 431 performs binary multi-value conversion, and therefore both binary and multi-value output are possible.

An image conversion unit 417 has various types of image conversion functions used to convert images in the RAM 402 and write the images back into the RAM 402 again. A rotator 422 can rotate an image in a unit of 32×32 pixels to a specified angle, and supports binary and multi-value input and output. A multiplier 423 has a function for converting (e.g., from 600 dpi to 200 dpi) or multiply the resolution of an image (e.g., from 25% to 400%). The multiplier 423 reorders the 32×32 pixel image into an image in units of 32 lines before the multiplying. A color space conversion unit 424 converts a multi-value input image into a Lab image using matrix operations and LUTs, e.g., converts a YUV image in the RAM 402 into a Lab image, which is then stored in the RAM 402. This color space conversion unit 424 has a 3×8 matrix operation and a one-dimensional LUT, and can perform publicly-known base-skipping, backlighting prevention, and the like. The converted image is output in a multi-value format. A binary-to-multi-value conversion unit 425 converts a 1-bit binary image into a multi-value 8-bit, 256-tone image. Conversely, a multi-value-to-binary conversion unit 429, for example, converts an 8-bit, 256-tone image in the RAM 402 to a 1-bit, 2-tone image by a method such as error diffusion processing, and stores the image in the RAM 402. A compositing unit 426 has a function of combining two multi-value images in the RAM 402 into a single multi-value image. For example, by compositing a company logo image and the document image in the RAM 402, the company logo can be easily added to the document image. A thinning unit 427 is a unit that performs resolution conversion by thinning out the pixels of a multi-value image, and is capable of outputting ½, ¼, and ⅛ multi-value images. This can be used in conjunction with the multiplier 423 to perform a wider range of magnification and reduction. A moving unit 428 can output an input binary image or multi-value image with an added margin area or with a margin area deleted. The rotator 422, the multiplier 423, the color space conversion unit 424, the binary-to-multi-value conversion unit 425, the compositing unit 426, the thinning unit 427, the moving unit 428, and the multi-value-to-binary conversion unit 429 can operate in conjunction with each other. For example, if a multi-value image in the RAM 402 is to undergo image rotation and resolution conversion, both processes can be performed in conjunction without going through the RAM 402.

FIG. 4B illustrates an image format. The format of images according to the present embodiment uses an image packet structure such as that disclosed in Japanese Patent Laid-Open No. 2001-103473. Specifically, in the compressor 413, an image 470 in raster format is reordered as packets 471 in units of 32×32 pixels as illustrated in FIG. 4B, and JPEG compression is performed on each packet. At the same time, information such as an ID indicating a location of the packet, a color space, a Q table ID, a data length, and the like are added to the packet and used as a header. Further still, binary data indicating text and photos (an image area flag) is also compressed in the same way, and is added to the end of the JPEG. 472 indicates the packet data. The decompressor 431 decompresses the JPEG based on this header information and rearranges the data into a raster image. Using such a packet image is very efficient because when rotating the image, only the image inside the packet is rotated, and by changing the position of the packet ID, the image can be rotated with partial decompression and compression. All images flowing on the image bus 419 are packet images. When a raster image is required for FAX transmission, the binary image rotation unit 410, the binary image compressor/decompressor 411, the conversion from a packet image to a raster image is performed by software.

Figure 4C:
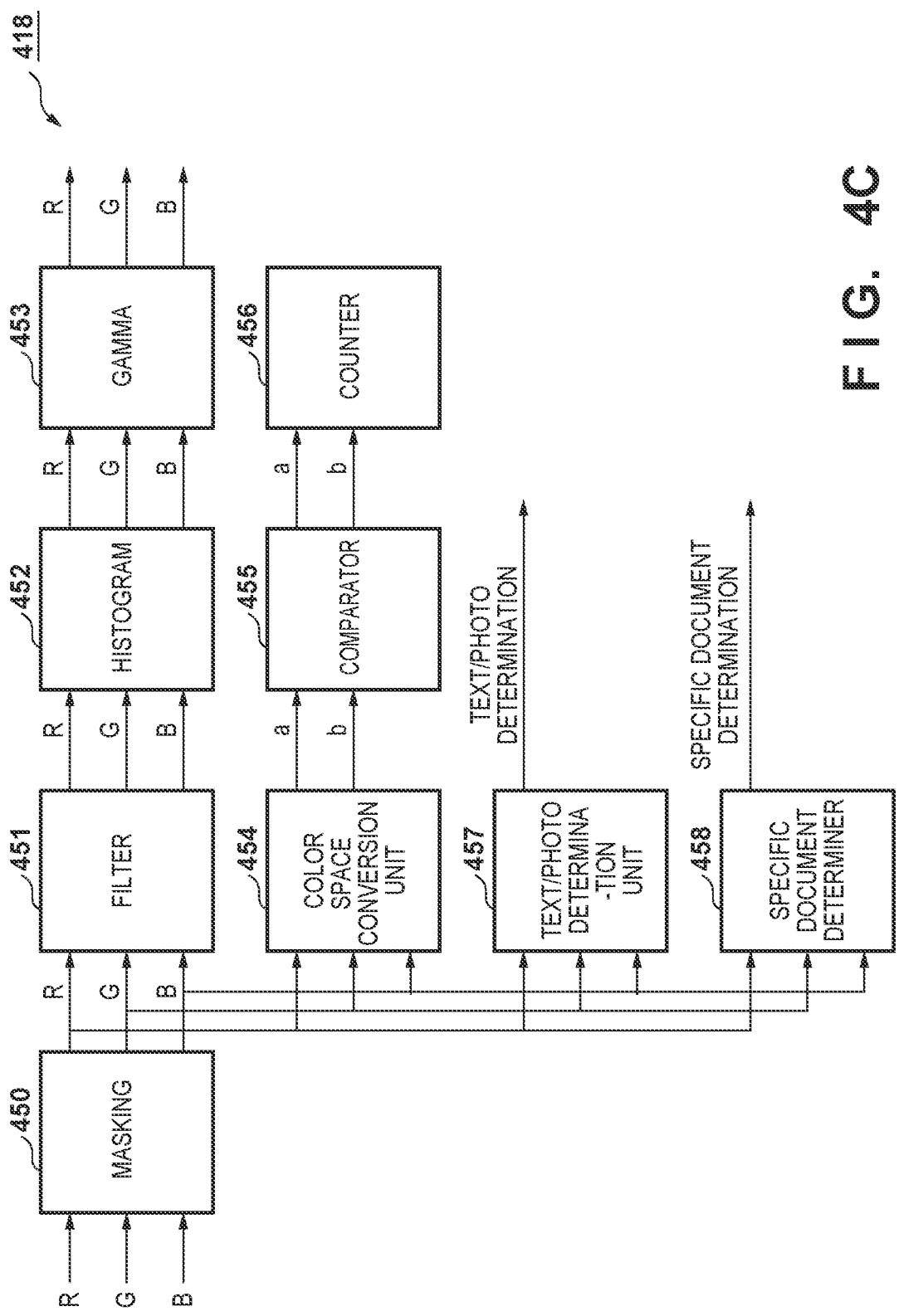
FIG. 4C is a diagram illustrating a scanner image processing unit 418 according to an embodiment.

FIG. 4C illustrates the processing configuration of the scanner image processing unit 418 in detail. 8-bit RGB luminance signals input from a scanner are converted to a standard RGB color signal independent of filter colors of an image sensor by masking 450. A filter 451 uses, for example, a 9×9 matrix to perform processing for blurring the image, sharpening the image, and so on. A histogram 452 is a processing unit that samples the image signal data in the input image, and is used to determine a base level of the input image. This module creates a histogram by sampling the RGB data in a rectangular area defined by start points and end points specified in a main scanning direction and a sub scanning direction, respectively, at a set pitch in the main scanning direction and the sub scanning direction. The created histogram is read out when base-skipping, backlighting prevention, or the like is specified, the base of the document is estimated from the histogram, and a base-skipping level is stored and managed in the RAM 402, the HDD 407, or the like along with the image and is used for image processing during printing or transmission. In gamma 453, processing is performed to increase or reduce the density of the image as a whole. For example, this processing unit converts the color space of the input image to a desired color space, performs correction processing related to the color of the input system, and the like. In order to determine whether a document is color or black-and-white, the image signal before magnification is converted to the publicly-known Lab format by a color space conversion unit 454. The a and b indicated in FIG. 4C represent color signal components. A 1-bit determination signal is output from a comparator 455 as a chromatic color if the component is at least a predetermined level in the comparator 455, and as an achromatic color if not. A counter 456 measures the output from the comparator 455. A text/photo determination unit 457 is a processing unit that extracts text edges from images and separates images into text and photos. A text/photo determination signal is output as the output from this unit. This signal, along with the image, is also stored in the RAM 402 or the HDD 407 and used during printing. A specific document determiner 458 compares the input image signal and a pattern held internally in the determiner to confirm a degree of matching, and outputs a result of the determination, indicating a match or a mismatch. Depending on the determination result, the image can be processed to prevent counterfeiting, such as for banknotes, securities, and the like.

FIG. 4D illustrates the processing configuration of the printer image processing unit 432 in detail. A base-skipping unit 460 skips a base color of image data and removes the unwanted base fogging. For example, a 3×8 matrix operation or a one-dimensional LUT is used for the base-skipping. A monochrome generation unit 461 converts color image data, e.g. RGB data, to gray monochrome data when converting color image data to monochrome data and printing as monochrome. For example, the monochrome generation unit 461 is constituted by a 1×3 matrix operation in which RGB is multiplied by a given constant to produce a gray signal. An output color correction unit 462 performs color correction according to the characteristics of the printer function unit 202 that outputs the image data. The output color correction unit 462 is constituted by processing using, for example, a 4×8 matrix operation, direct mapping, or the like, and generates a six-color CMYKLcLm image signal or a four-color CMYK image signal from the input RGB image signal. In the present embodiment, image signals corresponding to the six toner colors of the printer function unit 202, i.e., cyan (C), magenta (M), yellow (Y), black (K), light cyan (Lc), and light magenta (Lm), are output, each at 600 dpi and 8 bits. Alternatively, image signals corresponding to the four colors of cyan (C), magenta (M), yellow (Y), and black (K) are output at 600 dpi (dots per inch) and 8 bits each. The output of the six-color and four-color image signals is switched through processing which will be described later. A filter processing unit 463 performs desired correction on the spatial frequency of the image data, and is constituted by processing that performs, for example, a 9×9 matrix operation. A gamma correction unit 464 performs gamma correction according to the characteristics of the printer function unit 202 for output, and normally is constituted by a one-dimensional LUT. A half-tone correction unit 465 is a processing section that performs desired half-tone processing according to the number of tones output by the printer function unit 202, and is a half-tone processing unit that performs desired screen processing, such as binarization and conversion to 32-value data, error diffusion processing, and the like. Each of the processing units can also be switched by a text/photo determination signal (not shown). Inter-drum delay memory 466 is memory for superimposing CMYKLcLm images by shifting the printing timings of CMYKLcLm among the drums in a color printer having a drum for each of the CMYKLcLm colors. This delay can be performed to align the images for six colors for each of the colors in a color printer having six drums for each of the CMYKLcLm colors. Of course, when the output of the output color correction unit 462 is the four CMYK colors, the delay can also be adjusted in the inter-drum delay memory 466.

Although the present embodiment uses an electrophotographic printer function unit, the printer function unit is not limited thereto, and an inkjet printer function unit can also be used.

Example of Display in Operation Unit 250

Figure 8:
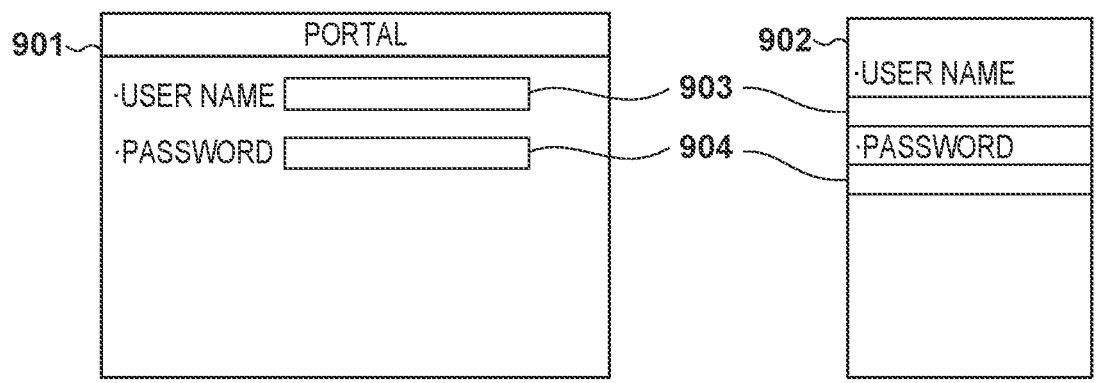

An example of a display made in the operation unit 250 of the MFP 101 according to the present embodiment will be described next with reference to FIGS. 7A1-7A8. The operation unit 250 is provided with various types of key groups for instructing image formation operations, such as the details of image editing, a number of copies, and the like, for the image processing performed by the reader function unit 201, and a liquid crystal display unit 710 that displays details during operations. The operation unit 250 is also provided with a physical key group 720. The physical key group 720 is a variety of types of physical keys. A start key 723 is a key for starting copying, and a home key 722 is a key for returning the display and settings in the liquid crystal display unit 710 to a default state. A sleep key 721 is a key for putting the MFP 101 into a power-saving state.

700 indicates a basic menu screen. The liquid crystal display unit 710 is a touch-sensitive liquid crystal display, and key inputs can be performed by pressing various types of keys displayed in a key display part. A post-reading projector display key 711 is displayed as one of the various types of keys in the key display part. The post-reading projector display key 711 is a key for causing a document loaded in a document feeding apparatus or the reader function unit 201 to be read, converted to image data, transmitted to the projector 204 installed in the projector expansion unit 203, and projected.

When the post-reading projector display key 711 is pressed, a screen 701, in which "projector scan" is displayed in 740, is displayed in the liquid crystal display unit 710. A read key 741, a next page key 742, a previous page key 743, and an end key 744 are also displayed in the screen 701. When the read key 741 is pressed, a command is sent to the system bus 416 through the operation unit I/F 403. Having been notified of the command, the CPU 401 confirms the state of the projector 204 through the projector I/F 443, makes a display request, and furthermore sends the image read by the reader function unit 201 to the projector 204 and causes the image to be displayed by the projector. A next page can be displayed by pressing the next page key 742, and a previous page can be displayed by pressing the previous page key 743. The display of a scanned image ends when the end key 744 is pressed. Note, however, that the present disclosure is not limited thereto, and the same control as that performed when the read key 741 is pressed may be performed in response to the post-reading projector display key 711 being pressed. In other words, control may be performed so that a document is read by the reader function unit 201 and displayed by the projector 204 in response to a one-touch operation made by the user. This makes it possible to simplify user operations, and provide a more user-friendly operation system. Alternatively, a one-touch key corresponding to the above descriptions may be provided separate from the post-reading projector display key 711.

702 indicates a menu screen pertaining to the projector 204. The screen 702 may be transitioned to from the screen 700. In this case, a projector key may be displayed, in a selectable manner, as part of the various types of key groups, in the screen 700 in the liquid crystal display unit 710. In this case, the screen transitions to the screen 702 in response to the projector key being pressed. Note that the projector key may be included in the physical key group 720. The screen 702 includes a projector image print key 712, a settings key 713, a web conference settings key 714, a web conference start/end key 715, and a file display key 716.

When the projector image print key 712 in the screen 702 is pressed, a screen 703, in which "projector printing" is displayed in 745, is displayed. The screen 703 is configured including a copy number settings key 746, a density settings key 747, and a print start key 748. The number of copies to be printed can be set by pressing the copy number settings key 746. The density to be used during printing can be set by pressing the density settings key 747. When the print start key 748 is pressed, the controller unit 400 confirms the state of the projector 204 from the projector I/F 443 through the projector control cable 206. Information indicating whether or not an image is displayed, the resolution of the image, and so on is acquired, and if there is an image being displayed, the CPU 401 sends the image data to the printer function unit 202 and prints the image.

The projector settings key 713 in the screen 702 is a key for making settings for the projector, and when the projector settings key 713 is pressed, manual distortion correction, manual trapezoidal distortion correction, light intensity adjustment, and the like (not shown) can be executed. The web conference settings key 714 is a key for making settings for conducting a web conference, and is a key for acquiring a web conference session from the relay server 106. When acquiring a web conference session, a session confirmation screen 724 is displayed in the liquid crystal display unit 710 in response to the web conference settings key 714 being pressed. In the session confirmation screen 724, a web conference time is displayed in 730, and a web conference time input area is displayed in 731. Furthermore, in the session confirmation screen 724, "session number" is displayed in 732, "210" is displayed in 733 as the session number, and a participant key 734 is displayed in a selectable manner. When a time is input in the web conference time input area 731, a device number held by the MFP 101 and the web conference time are transmitted; as a result, this information is transmitted from the relay server 106, and the session number is displayed in 733 in the liquid crystal display unit 710. When the participant key 734 is pressed, a participant settings screen 726 is displayed. In the participant settings screen 726, "participant setting: 210" is displayed in 770, a participant target is acquired from the relay server 106 from an account management service (described later), and the acquired participant target is displayed in a display area 771. In the example illustrated in FIG. 7A8, the display area 771 displays MFP-A/MFP-B, in which participation is set, and MFP-C, in which participation is not set. MFP-C can also participate in the web conference by selecting MFP-C and pressing an add key 774. Scroll keys 775 and 776 can be pressed to display participant targets which do not fit in the display area 771. Additionally, pressing a start key 772 makes it possible to start a conference even if the start date/time has not yet been reached. Pressing an end key 773 makes it possible to end a conference which has started.

At the start of a web conference, a session selection start screen 725 is displayed when the web conference start/end key 715 in the screen 702 is pressed. The session number displayed by pressing the web conference settings key 714 is displayed in a session number input area 735. When a corresponding session number is input in this area and a session start key 736 is pressed, the session number, start time, and device number of the MFP are communicated to a session management service (described later), and if there is a match, the web conference can be started. A session which has been started can be ended by pressing a session end key 770.

When the file display key 716 of the projector is pressed in the screen 702, a screen 704, in which a projector file screen is displayed in 750, is displayed in the liquid crystal display unit 710. The screen 704 is configured including a URL setting key 751, a URL display area 752, a display key 753, a next page key 754, a previous page key 755, and an end key 756. By pressing the URL setting key 751, whether to use an external server or an internal file system can be selected, and if the external server is selected, the file to be displayed by the projector 204 can be specified in the URL display area 752. By pressing the display key 753, the CPU 401 is notified of commands via the system bus 416 with respect to data that has been converted into an image by an image expansion unit (described later). Having been notified of the command, the CPU 401 confirms the state of the projector 204 through the projector I/F 443, makes a display request, sends the image to the projector 204, and instructs the projector to display the image. A next page can be displayed by pressing the next page key 754, and a previous page can be displayed by pressing the previous page key 755. The display of the scanned image ends when the end key 756 is pressed.

Remote Operation Unit

A remote operation unit that implements the operation unit 250 according to the present embodiment through software on an external PC will be described next with reference to FIGS. 9A and 9B. The remote operation unit is realized by displaying a screen, which is displayed in the operation unit 250 of the MFP 101, in the display of the PC 103, which is an external PC, and receiving user inputs made through the displayed screen. The PC 103 performs network communication with the MFP 101 over the network 100, and outputs a request for the remote operation unit in the Hypertext Transfer Protocol (HTTP) format. The network 100 is connected to the LAN circuit 404, which is capable of Internet communication with the controller unit 400 of the MFP 101, and the request for the remote operation unit is communicated to the controller unit 400 through the LAN circuit 404.

Having received the request for the remote operation unit in the PC 103, the controller unit 400 sends screen information of a user authentication screen 901 to the external PC. If the request is received from an external tablet or mobile device (not shown), screen information of a user authentication screen 902 having a modified layout is sent to the external mobile device. Hereinafter, it is assumed that when accessed from a mobile device, the layout is modified before being sent to the external tablet or mobile device. The following descriptions will take screens 981 to 987 in the external PC as an example. The corresponding screens 991 to 997 displayed in the external mobile device correspond to the screens 981 to 987, respectively, and because only the layout is modified, the screens 991 to 997 will not be described.

When the input of a username 903 and a password 904 are accepted in the user authentication screen 901 from the PC 103, the input information is sent to the MFP 101 as authentication data, and the controller unit 400 determines whether or not that data matches data which is already held. If the data matches, a top-level screen 981 of the remote operation unit is sent to the PC 103. The top-level screen 981 includes a device state confirmation key 906 and a consumables state confirmation key 908. When the device state confirmation key 906 is entered on the PC 103, the software on the PC 103 sends a request for state information of the printer function unit 202, the reader function unit 201, the projector 204, and the modem 405 to the MFP 101 over the network. When state information communicated in response to the request is received, a browser of the PC 103 displays the state information in a state display area 907. Likewise, when the consumables state confirmation key 908 is entered, information is acquired from the MFP 101 and displayed in a display area 909. A projector print key 911, a projector scan key 912, a projector settings key 913, a web conference start key 914, a web conference settings key 915, and a projector file display key 916 are provided in the top-level screen 981 as functions 910.

When the projector scan key 912 is pressed, a screen 982, in which "projector scan" is displayed in 920, is displayed, and a read key 921, a next page key 922, a previous page key 923, and an end key 924 are displayed. When the read key 921 is pressed, a command is sent to the MFP 101 over the network 100. Having been notified of the command, the CPU 401 confirms the state of the projector 204 through the projector I/F 443, makes a display request, and furthermore sends the image read by the reader function unit 201 to the projector 204 and causes the image to be displayed by the projector. A next page can be displayed by pressing the next page key 922, and a previous page can be displayed by pressing the previous page key 923. The display of a scanned image ends when the end key 924 is pressed.

When the projector print key 911 is pressed, a screen 983, in which "projector printing" is displayed in 930, is displayed, and a copy number settings key 931, a density settings key 932, and a print start key 933 are displayed. The number of copies to be printed can be set by pressing the copy number settings key 931. The density for printed materials can be set by pressing the density settings key 932. When the print start key 933 is pressed, a command is sent to the MFP 101 over the network 100, and the controller unit 400 confirms the state of the projector 204 from the projector I/F 443 through the projector control cable 206. The controller unit 400 acquires information indicating whether or not an image is displayed, the resolution of the image, and so on, and if there is an image being displayed, the image data is sent to the printer function unit 202, which prints the image.

The web conference settings key 915 is a key for making settings for conducting a web conference, and is a key for acquiring a web conference session from the relay server 106. When acquiring a web conference session, a session confirmation screen 986 including displays 960 to 965 is displayed in response to the web conference settings key 915 being pressed. In the session confirmation screen 986, the conference time is displayed in 961 and an input area is displayed in 962, which are located under web conference settings, indicated by 960. When the conference time is input in the input area 962, the MFP 101 sends the device number which is held and the web conference time. As a result, that information is sent to the PC 107 of the web conferencing system via the relay server 106, and a response including the session information is received. Once the response is received, the MFP 101 notifies the PC 103 of the screen information or the session information, and causes the session number to be displayed in a display area 964. When a participant key 965 is pressed, a screen 987 is displayed, and participant targets are acquired from an account management service (described later) of the relay server 106 and displayed in a display area 971. In the example in FIG. 9B, MFP-A/MFP-B, which are set to participate, and MFP-C, which is not set to participate, are displayed in the display area 971. MFP-C can also participate in the web conference by selecting MFP-C and pressing an add key 976. Scroll keys 977 and 978 can be pressed to display participant targets which do not fit in the display area 971. Here, pressing a start key 975 makes it possible to start a web conference even if the start date/time has not yet been reached. Pressing an end key 974 makes it possible to end a web conference which has started.

When the web conference start key 914 in the top-level screen 981 is pressed, a session selection start screen 985, including displays 950 to 958, is displayed. In a screen 985, "session number" is displayed in 951, and session numbers which can be selected are displayed in a selectable manner in an input area 952. When a corresponding session number is input (selected) and a session start key 956 is entered, the session number, the start time, and the device number of the MFP 101 are communicated to a session management service (described later). Then, it is determined if there is a match, and if so, the web conference is started. Additionally, scroll keys 957 and 958 can be pressed to display session numbers which do not fit in the display area 971. Here, when the start key 956 is pressed, the web conference can be started through a session. Pressing an end key 955 makes it possible to end a session which has started.

When the projector file display key 916 is pressed, a screen 984, in which "projector file display" is displayed in 940, is displayed, and a URL selection key 941, a URL display area 942, and a display key 943 are displayed. Furthermore, a next page key 944, a previous page key 945, and an end key 946 are displayed in the screen 984. When the URL selection key 941 is pressed, whether to use an external server or an internal file system can be selected, and if the external server is selected, the file to be displayed by the projector 204 can be specified in the URL display area 942. By pressing the display key 943, the CPU 401 is notified of commands via the system bus 416 with respect to data that has been converted into an image by an image expansion unit (described later). Having been notified of the command, the CPU 401 confirms the state of the projector 204 through the projector I/F 443, makes a display request, sends the image to the projector 204, and instructs the projector to display the image. A next page can be displayed by pressing the next page key 944, and a previous page can be displayed by pressing the previous page key 945. The display of the file image ends when the end key 946 is pressed.

Printer Function Unit Pre-Preparation Operations

Pre-preparation operations for putting the printer function unit 202 into a state in which image formation operations are possible will be described next with reference to FIGS. 3 and 5. The pre-preparation operations are preparation operations performed before receiving an image formation start signal from the controller unit 400. Accordingly, the CPU 504 of the image formation control unit 550 starts driving the motors 509 to 512 in preparation for image formation start signals for both monochromatic images and color images. Here, when the motors 509 to 512 are driven, the developers 255$y$, 255$m$, 255$c$, and 255$k$ and the photosensitive drums 252$y$, 252$m$, 252$c$, and 252$k$ are rotationally driven. When the speeds of the motors 509 to 512 rise to a constant speed, the CPU 504 drives the separation motor 513 to bring the intermediate transfer belt 258 into contact with the process units 251$y$, 251$m$, 251$c$, and 251$k$. Furthermore, the CPU 504 charges the photosensitive drums 252$y$, 252$m$, 252$c$, and 252$k$ to a negative polarity. Then, in the pre-preparation operations when the power is turned on or when returning from the power-saving mode, image density correction control to make the image density constant, color shift correction control, and the like are performed if the internal state of the printer function unit 202 has changed due to remaining idle for a long period of time. Additionally, in operations for returning after a jam occurs, cleaning control is performed to remove toner remaining on the intermediate transfer belt 258 and the photosensitive drums 252$y$, 252$m$, 252$c$, and 252$k$. Any method may be used for the image density correction control, the color shift correction control, and the cleaning control, and thus these will not be described in detail. Note that if the intermediate transfer belt 258 and the process unit 251$k$ are in contact with each other when a jam occurs, the cleaning control may be used to remove toner remaining in the intermediate transfer belt 258 and the photosensitive drum process unit 251$k$ in the operation for returning after the jam. In other words, the cleaning control need not be performed for the photosensitive drums 252$y$, 252$m$, and 252$c$.

Image Formation Operations by Printer Function Unit

Basic image formation operations performed when an image formation request is received while the printer function unit 202 is in a standby state with operations stopped will be described next with reference to FIGS. 3 and 5. Upon receiving the image formation start signal, the CPU 504 starts driving the motor 512. Here, when the motor 512 is driven, the developer 255$k$ and the photosensitive drum 252$k$ are rotationally driven. When the speed of the motor 512 rises to a constant speed, the CPU 504 drives the separation motor 513 to bring the intermediate transfer belt 258 into contact with the process unit 251$k$. Furthermore, the photosensitive drum 252$k$ is charged to a negative polarity. The laser exposure apparatus 254$k$ then emits the image signal input from the exterior from a laser light emitting unit to form an electrostatic latent image on the photosensitive drum 252$k$.

The developer 255$k$ is applied with a developing bias of the same polarity as the charging polarity of the photosensitive drum 252$k$ (negative polarity), which causes black toner to adhere to the electrostatic latent image formed on the photosensitive drum 252k and visualizes the image as a toner image. In primary transfer, a primary transfer bias (of the polarity opposite from the toner, i.e., positive polarity) is applied to the primary transfer roller 257k. At this time, the toner image on the photosensitive drum 252k undergoes primary transfer to the intermediate transfer belt 258, which is being driven, in a state where the primary transfer roller 257k is pressed against the photosensitive drum 252k with the intermediate transfer belt 258 therebetween.

The toner image on the intermediate transfer belt 258 is transferred to a secondary transfer section between the drive roller 272 and the secondary transfer roller 260. In accordance with the timing at which the leading end of the toner image moves to the secondary transfer section, the storage medium, such as paper, fed by the paper feed cassette 263 passes through a conveyance path formed substantially vertically, and is conveyed to the secondary transfer section by the resist roller 265. The toner image is transferred at once to the storage medium conveyed to the secondary transfer section by the secondary transfer roller 260 to which a secondary transfer bias (of the polarity opposite from the toner, i.e., positive polarity) is applied. Residual toner remaining on the intermediate transfer belt 258 after the secondary transfer is scraped off by the transfer cleaning apparatus 261, and is conveyed and collected as recovered toner. The storage medium on which the toner image is formed is conveyed to the fixing apparatus 267, which is located downstream from the secondary transfer section. The toner image formed on the storage medium is heated and pressurized at a fixing nip section between the fixing roller 268 and the pressure roller 269, and is thermally fixed to the surface of the storage medium. The series of image formation operations is completed through the operations described above.

Additionally, when image formation start signals for forming a color image are received, the CPU 504 drives the separation motor 513 and brings the intermediate transfer belt 258 into contact with the process units 251y, 251m, 251c, and 251k. Thereafter, image formation operations for each color are performed in the same way as for monochromatic images.

Job Information

The job information will be described next with reference to FIG. 8. Job information 800 is configured including job presence/absence 801, a page number 802, and per-page color data 803. The example in FIG. 8 illustrates job information for a job in which the first page is a monochromatic image, the second page is a color image, and the third page is a color image. In other words, in the job information 800, the job presence/absence 801 indicates "present", the page number 802 is set to three pages, and monochromatic, color, and color are stored as the per-page color data 803.

Accordingly, when there is data in the job presence/absence 801, it can be determined that job information is stored. In addition, by confirming the color of each page only for the page number 802, it is possible to determine whether or not a job includes color pages. Note that when a plurality of instructions to start image formation for a job are received, the job information is handled collectively, and the number of pages and the color for each page are updated.

Projector

Figure 6:
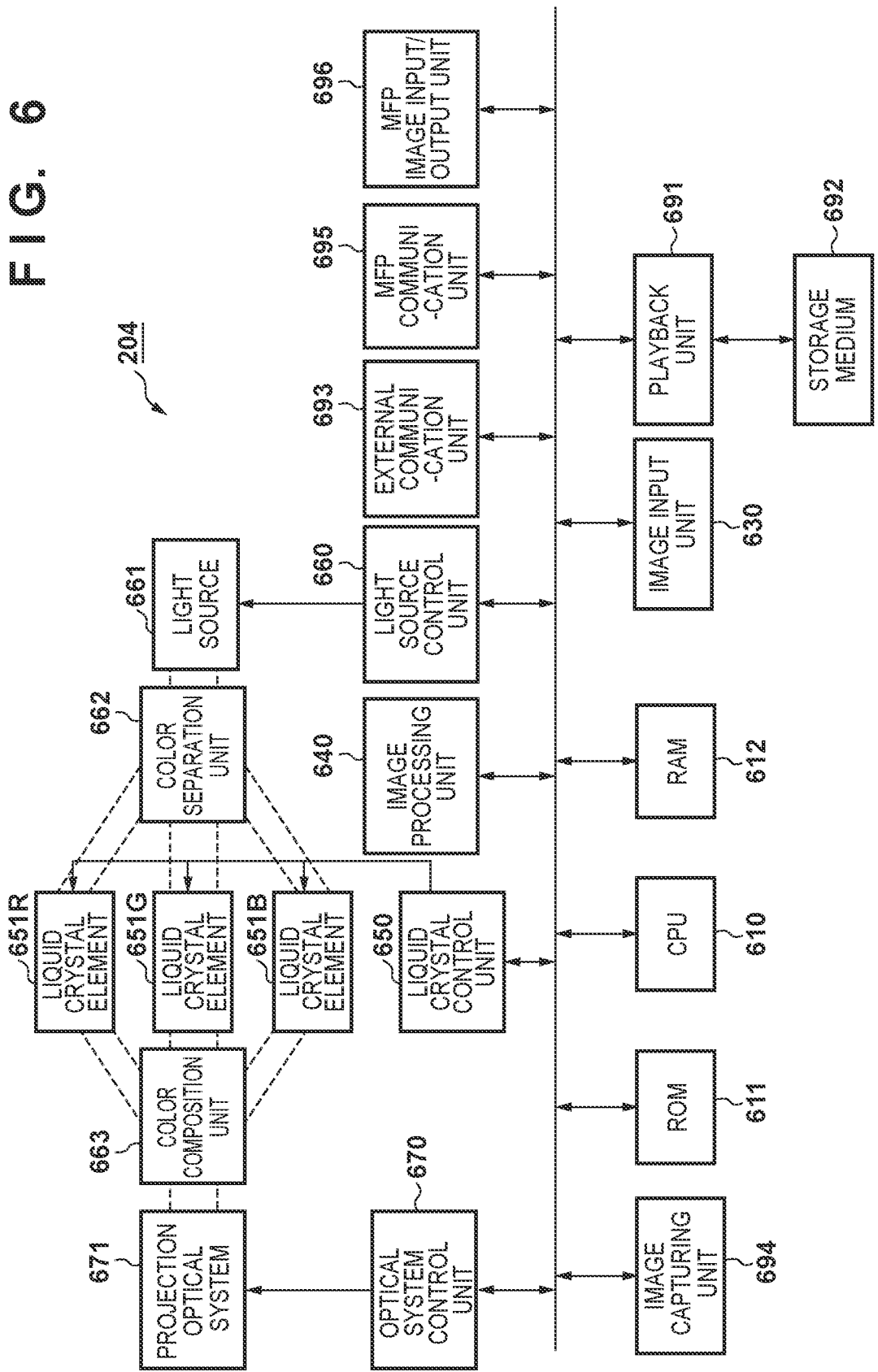
FIG. 6 is a diagram illustrating a projector control unit according to an embodiment.

The projector according to the present embodiment will be described next with reference to FIG. 6. The present embodiment will describe a projector that uses a transmissive liquid crystal panel as an example of a projection apparatus. However, the present disclosure is not limited to a projector that uses a transmissive liquid crystal panel as a display device. For example, embodiments of the present disclosure can also be applied in projectors using display devices such as DLP (Digital Light Processing), LCOS (Liquid Crystal On Silicon reflective liquid crystal) panels, and the like. Liquid crystal projectors (called simply "projectors") are generally known as single-plate types, three-plate types, or the like, but either type may be used. The liquid crystal projector according to the present embodiment projects an image by controlling the light transmittance of a liquid crystal element according to the image to be displayed, and projecting the image onto the screen with light from a light source transmitted through the liquid crystal element. The configuration and operations of the projector 204 will be described hereinafter.

The projector 204 according to the present embodiment includes a CPU 610, ROM 611, RAM 612, an image input unit 630, an image processing unit 640, an external communication unit 693, an MFP communication unit 695, and the MFP image input/output unit 696. The projector 204 also includes a liquid crystal control unit 650, liquid crystal elements 651R, 651G, and 651B, a light source control unit 660, a light source 661, a color separation unit 662, a color composition unit 663, an optical system control unit 670, and a projection optical system 671. The projector 204 further includes a playback unit 691, a storage medium 692, a communication unit 693 that communicates with an external apparatus, and an image capturing unit 694.

The MFP communication unit 695 is connected to the projector control cable 206, which is connected to the MFP connection connector 208, and communicates with the MFP 101. The CPU 610 determines the status of communication with the MFP 101 and communication with the external apparatus, and determines whether to input/output an image. When it is determined that an image is to be input/output, the MFP image input/output unit 696 performs image input/output with the MFP 101 through the projector projection image cable 207, in accordance with instructions from the CPU 610.

The CPU 610 controls the various blocks of the projector 204. The ROM 611 is memory which stores a control program describing processing sequences for the CPU 610. The RAM 612 serves as work memory, and is memory that temporarily stores control programs, data, and the like. The CPU 610 temporarily stores still image data, moving image data, and the like played back from the storage medium 692 by the playback unit 691 in the RAM 612, and plays back corresponding images, video, and the like using programs stored in the ROM 611. In other words, the RAM 612 functions as graphic memory of the projector 204. The CPU 610 can also temporarily store images, video, and the like acquired by the image capturing unit 694 in the RAM 612, convert those images, video, and the like into still image data, moving image data, and the like using programs stored in the ROM 611, and record the resulting data in the storage medium 692.

The image input unit 630 receives an image signal from the external apparatus, and includes, for example, a composite terminal, an S image input terminal, a D terminal, a component terminal, an analog RGB terminal, and the like. The image input unit 630 also includes, for example, a DVI terminal, a DVI-D terminal, an HDMI (High Definition Multimedia Interface) (registered trademark) terminal, and the like. Additionally, when an analog signal is received, the image input unit 630 converts the received analog signal into a digital signal. The image input unit 630 then sends the received image signal to the image processing unit 640. Here, the external apparatus may be any apparatus capable of outputting an image signal, such as a personal computer, a camera, a mobile phone, a smartphone, a hard disk recorder, or the like.

The image processing unit 640 is a unit that performs processing for changing the number of frames, number of pixels, image shape, and the like on the image signal received from the image input unit 630 or the external communication unit 693 and sends the resulting data to the liquid crystal control unit 650, and is constituted by, for example, a microprocessor for image processing. It is not necessary for the image processing unit 640 to be a dedicated microprocessor, and for example, the CPU 610 may execute the same processing as that performed by the image processing unit 640 using programs stored in the ROM 611. The image processing unit 640 is capable of executing functions such as frame thinning processing, frame interpolation processing, resolution conversion processing, OSD superimposition processing for menus and the like, distortion correction processing (keystone correction processing), and edge blending. In addition to the received signals received from the image input unit 630, the image processing unit 640 can also perform the aforementioned change processing on images, video, and the like played back by the CPU 610.

The liquid crystal control unit 650 controls voltages applied to liquid crystals of pixels of the liquid crystal elements 651R, 651G, and 651B on the basis of the image signals processed by the image processing unit 640, and adjusts the transmittances of the liquid crystal elements 651R, 651B, and 651G. It is not necessary for the liquid crystal control unit 650 to be a dedicated microprocessor, and for example, the CPU 610 may execute the same processing as that performed by the liquid crystal control unit 650 using programs stored in the ROM 611. For example, when an image signal is input to the image processing unit 640, the liquid crystal control unit 650 controls the liquid crystal elements 651R, 651B, and 651G to take on transmittances corresponding to the image each time one frame of the image is received from the image processing unit 640. The liquid crystal element 651R is a liquid crystal element for red, and is for adjusting the transmittance of red among the light output from the light source 661 and separated into red (R), green (G), and blue (B) by the color separation unit 662. The liquid crystal element 651G is a liquid crystal element for green, and is for adjusting the transmittance of green among the light output from the light source 661 and separated into red (R), green (G), and blue (B) by the color separation unit 662. The liquid crystal element 651B is a liquid crystal element for blue, and is for adjusting the transmittance of blue among the light output from the light source 661 and separated into red (R), green (G), and blue (B) by the color separation unit 662. The specific operations for controlling the liquid crystal elements 651R, 651G, and 651B by the liquid crystal control unit 650, and the details of the configurations of the liquid crystal elements 651R, 651G, and 651B, will be described later.

The light source control unit 660 controls the light source 661 to turn on and off, controls the light intensity thereof, and so on, and is constituted by a microprocessor for control. It is not necessary for the light source control unit 660 to be a dedicated microprocessor, and for example, the CPU 610 may execute the same processing as that performed by the light source control unit 660 using programs stored in the ROM 611. The light source 661 outputs light for projecting images onto a screen (not shown), and may be, for example, a halogen lamp, a xenon lamp, a high-pressure mercury lamp, or the like. The color separation unit 662 separates the light output from the light source 661 into red (R), green (G), and blue (B), and is constituted by, for example, a dichroic mirror, a prism, and the like.

Note that if LEDs (Light Emitting Diodes) or the like corresponding to each color are used as the light source 661, the color separation unit 662 is not necessary. The color composition unit 663 composites the red (R), green (G), and blue (B) light transmitted through the liquid crystal elements 651R, 651G, and 651B, and is constituted by, for example, a dichroic mirror, a prism, and the like. The light composited from the red (R), green (G), and blue (B) components by the color composition unit 663 is sent to the projection optical system 671. At this time, the liquid crystal elements 651R, 651G, and 651B are controlled by the liquid crystal control unit 650 so that the light transmittance corresponds to the image input from the image processing unit 640. Therefore, when the light composited by the color composition unit 663 is projected onto the screen by the projection optical system 671, the light is displayed on the screen in a manner corresponding to the image input by the image processing unit 640.

The optical system control unit 670 controls the projection optical system 671, and is constituted by a microprocessor for control. It is not necessary for the optical system control unit 670 to be a dedicated microprocessor, and for example, the CPU 610 may execute the same processing as that performed by the optical system control unit 670 using programs stored in the ROM 611. The projection optical system 671 is used to project the composited light output from the color composition unit 663 onto the screen. The projection optical system 671 is constituted by a plurality of lenses and lens actuators, and the lenses can be driven by the actuators so as to magnify, reduce, adjust the focus, and so on for the projected image.

The playback unit 691 reads out the still image data, the moving image data, and the like stored in the storage medium 692 into the RAM 612 and plays the data back, or receives the still image data, the moving image data, and the like of images, video, and the like obtained by the image capturing unit 694 from the CPU 610 and records the data in the storage medium 692. The playback unit 691 may also record the still image data, the moving image data, and the like received by the communication unit 693 into the storage medium 692. The playback unit 691 is constituted by, for example, an interface that is electrically connected to the storage medium 692, a microprocessor for communicating with the storage medium 692, and the like. It is not necessary for the playback unit 691 to include a dedicated microprocessor, and for example, the CPU 610 may execute the same processing as that performed by the playback unit 691 using programs stored in the ROM 611. The storage medium 692 can record still image data, moving image data, other control data necessary for the liquid crystal projector according to the embodiment, and the like. The storage medium 692 may be any type of storage medium, such as a magnetic disk, an optical disk, semiconductor memory, or the like. The storage medium 692 may be removable from the projector 204.

The external communication unit 693 is used to send and receive control signals, still image data, moving image data, and the like from an external apparatus. Here, the external communication unit 693 is connected to the HDMI connector 216 on the projector side, which is connected to the projector 204. The external communication unit 693 is also connected to the projector external input connector (HDMI) 213, which is connected from the projector external input I/F (HDMI) 210.

PC

Figure 10:
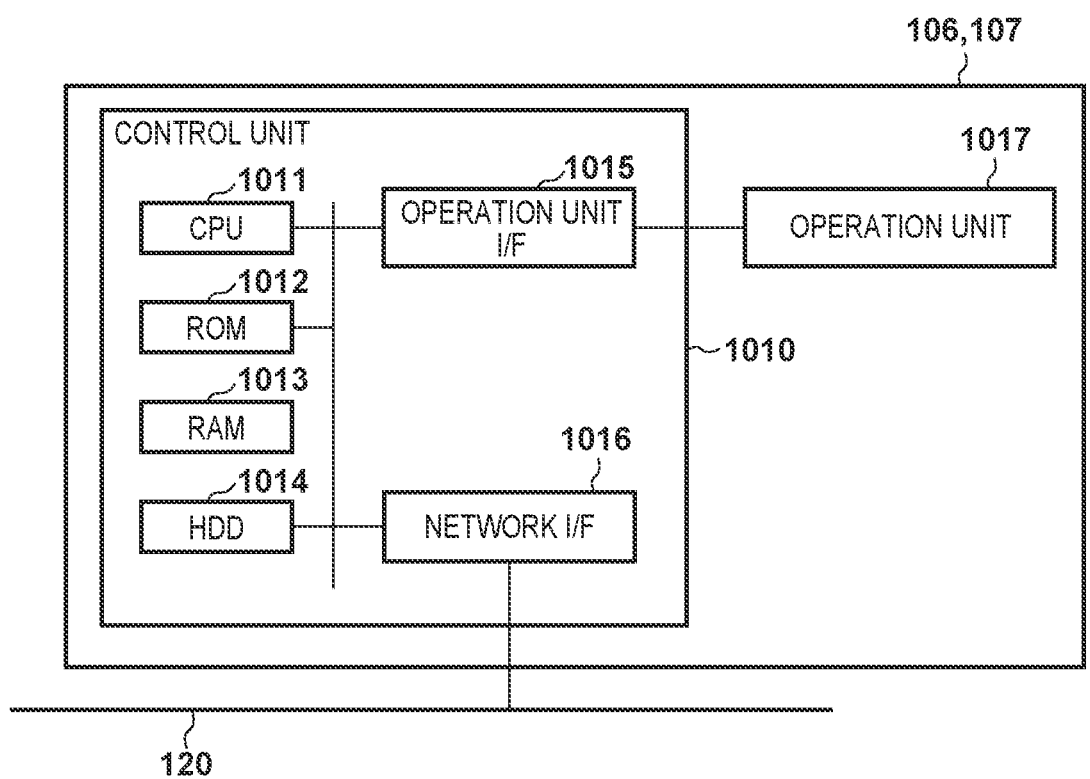
FIG. 10 is a diagram illustrating an example of the configurations of a relay server and a PC according to an embodiment.

The hardware configuration of the relay server 106 and the PC 107 of the web conference system according to the present embodiment will be described next with reference to FIG. 10.

The PC 107 includes a control unit 1010 and an operation unit 1017. The control unit 1010 includes a CPU 1011, ROM 1012, RAM 1013, an HDD 1014, an operation unit I/F 1015, and a network I/F 1016. The control unit 1010, which includes the CPU 1011, controls the PC 107 as a whole. The CPU 1011 implements the functions of the PC 107, the processing of the PC 107 in the sequence chart described below, and processing of a flowchart pertaining to the PC 107 by executing programs stored in the ROM 1012, the HDD 1014, or the like. The ROM 1012 stores various types of programs to be executed by the CPU 1011. The RAM 1013 is used as the main memory of the CPU 1011, a temporary storage region such as a work area, or the like. The HDD 1014 stores image data, various types of programs, and the like. The operation unit I/F 1015 connects the operation unit 1017 and the control unit 1010. The operation unit 1017 includes a liquid crystal display unit having a touch panel function, a keyboard, a mouse, and the like. The network I/F 1016 connects the control unit 1010 to the Internet 120.

The hardware configuration of the relay server 106 is similar to the hardware configuration of the PC 107 in terms of the basic configuration described above. That is, the CPU 1011 of the relay server 106 executes programs stored in the ROM 1012, the HDD 1014, or the like of the relay server 106. As a result, the relay server 106 implements the functions of the relay server 106, the processing of the relay server 106 in the sequence chart described below, and processing of a flowchart pertaining to the relay server 106.

Functional Configuration of Each Apparatus

The functional configurations of the MFP 101, the PC 107, and the relay server 106 according to the present embodiment will be described next with reference to FIG. 11. The relay server 106 includes a session management service 1121, the account management service 1122, the document management service 1123, and the relay service 1120. Two types of accounts can be registered with the account management service 1122, namely a user (individual) account and a connected device account. The user (individual) account requires a name, email address, and password to be entered, and group registration is possible as well, if necessary. The password is used for personal authentication. Although the authentication method is not particularly limited in the present embodiment, it is possible to use an authentication system of the relay server 106 itself, and the account management service can have its own authentication system. When registering a connected device, the device's device number, device name, and password are registered. The device's device number and the password are used for authentication. The data required for these accounts can be entered from the operation unit 1017 of the relay server 106. The session management service 1121 manages the session number, start time, and participating accounts. Participating accounts are accounts that have been authenticated by the account management service 1122. When a connection request is made from the exterior to the relay service 1120, the relay service 1120 makes a query to the session management service 1121. If the session and participants match, the relay service 1120 starts relay. The document management service 1123 determines whether or not the document can be displayed, and if the document cannot be displayed, displays an indication to the participant that the document cannot be displayed. In the present embodiment, the participating account is indicated as a connected device, but individual accounts are also possible.

The MFP 101 includes a web server 1102, a web browser 1131, the client 1132 which is a client program for the MFP 101 of the web conferencing system, a server-side proxy 1101, and a client-side proxy 1130. In this manner, the MFP 101 has an internal web browser function. Components 444 of the MFP 101 include an audio encoder 1105, an audio decoder 1106, a moving image encoder 1107, and a moving image decoder 1108.

The PC 107 includes a web browser 1111, a web conferencing system client 1112, and a client-side proxy 1110. In addition, the PC 107 includes an audio encoder 1113, an audio decoder 1114, a moving image encoder 1115, and a moving image decoder 1116. The client 1132 of the MFP 101 and the client 1112 of the PC 107 in the web conference system are both application programs. The client 1112 uses the moving image encoder 1115 to encode the image displayed in a display (not shown) of the PC 107. Additionally, audio input by a microphone connected to the PC 107 is encoded by the audio encoder 1113. The encoded audio and moving image are contained in HTTP (Hyper Text Transfer Protocol) files. Similarly, the encoded audio data contained in the HTTP file is decoded by the audio decoders 1106 and 1114. The audio is output by a speaker (not shown), and the encoded moving image data is decoded by the moving image decoders 1108 and 1116, and the moving image is displayed in the web browsers 1131 and 1111. The encoded audio data and moving image data is sent and received through HTTP via the relay service 1120.

Upon receiving a connection instruction via the operation unit 250, the server-side proxy 1101 establishes a connection with the relay service 1120 and then mediates (relays) the communication between the relay service 1120 and the web server 1102. The web server 1102 has a function for, upon receiving a request through HTTP (Hyper Text Transfer Protocol) communication from the relay server 106, returning a response to the request. The client-side proxy 1110 in the PC 107 mediates (relays) the communication between the web browser 1111 and the relay service 1120. The client-side proxy 1130 in the MFP 101 mediates (relays) the communication between the web browser 1131 and the relay service 1120. The relay service 1120 provides a web server function, and has a function for, upon receiving a request through HTTP communication from the PC 107 and the MFP 101, returning a response to the request.

HTTP communication between the server-side proxy 1101 and the relay service 1120, and HTTP communication between the client-side proxies 1110 and 1130 and the relay service 1120, will be described here. HTTP is a client/server-type protocol defined in RFC (Request For Comment) 2616, and has multiple methods. In general, the GET method is used when a client receives information from a server, and the POST method is used when a client sends information to a server. In the present embodiment, the POST method is used when the server-side proxy 1101 sends data to the relay service 1120, and when the client-side proxies 1110 and 1130 send data to the relay service 1120. The GET method is used when the server-side proxy 1101 receives data from the relay service 1120, and when the client-side proxies 1110 and 1130 receive data from the relay service 1120. Furthermore, separate connections are used for transmission and reception. The moving image data sent and received using the HTTP protocol is expanded in the RAM 402 of the controller unit 400, sent to the projector 204 via the projector I/F 443, and is displayed.

Processing Sequence
Projection of Read Image

Figure 12B:
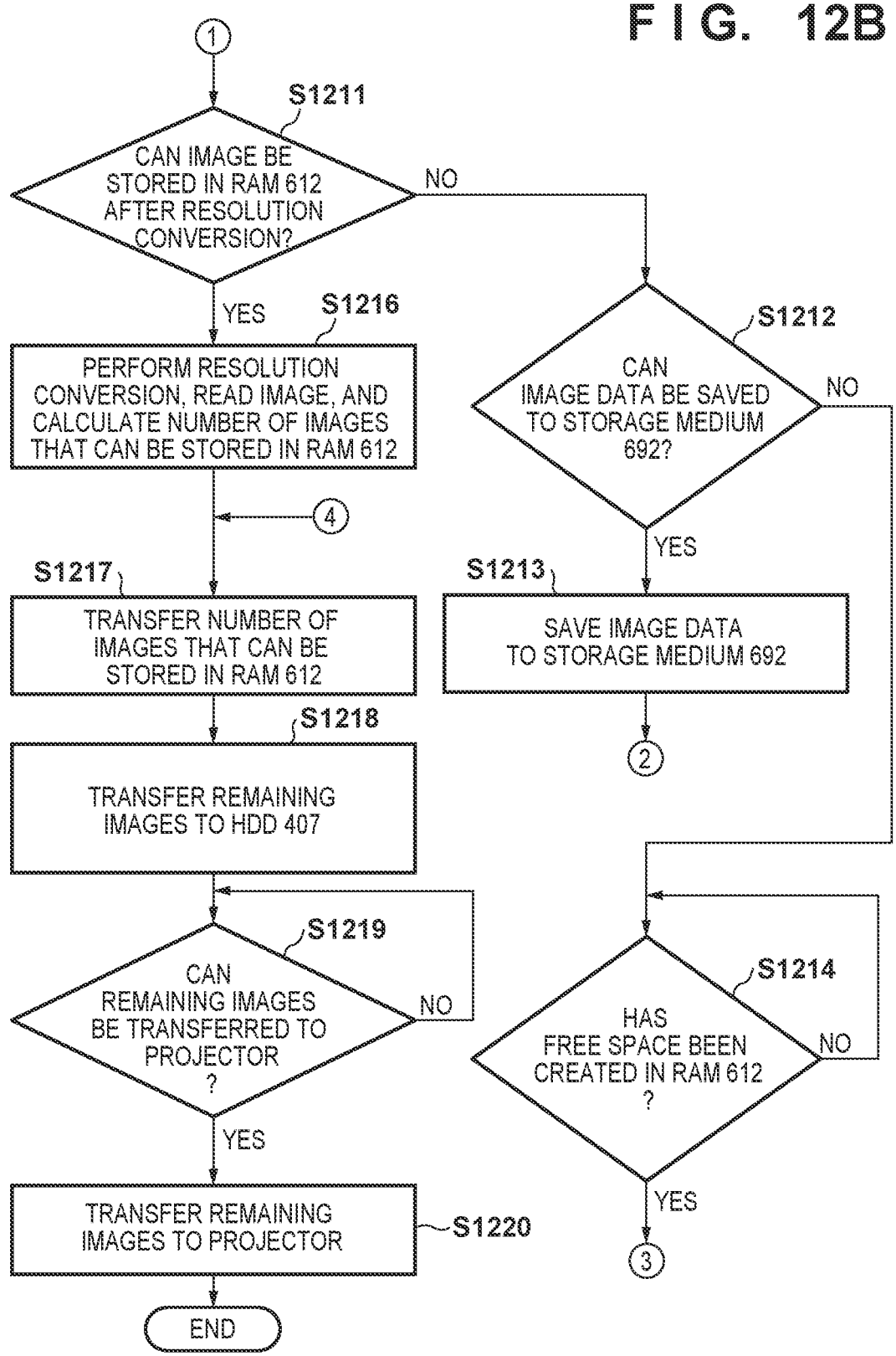

Various processing sequences will be described hereinafter with reference to FIGS. 12A to 14. FIGS. 12A-12B illustrates a processing sequence for reading an image using the reader function unit 201 and displaying the image using the projector 204. Operations performed when the post-reading projector display key 711 is pressed will be described here. The processing described below is realized by, for example, the CPU 401 reading out a program, stored in the ROM 406, the HDD 407, or the like in advance, into the RAM 402 and executing that program.

In step S1202, the CPU 401 detects that a document has been placed on an ADF by the user. Then, in step S1203, the CPU 401 detects that the post-reading projector display key 711 in the operation unit 250 has been pressed by the user. Specifically, for user operations performed through the operation unit 250, commands (operation information) are sent to the system bus 416 through the operation unit I/F 403 and are communicated to the CPU 401. The CPU 401 may start reading the document placed on the ADF using the reader function unit 201 at this timing. The timing of the start of reading may be any timing, such as, for example, after it is confirmed that the projector 204 is powered on (described later).

Next, in step S1204, the CPU 401, to which the command has been communicated, acquires the state of the projector 204 through the projector I/F 443, and determines whether or not the projector 204 is powered on on the basis of the acquired state information. If the projector 204 is not powered on, the sequence moves to step S1205, where the CPU 401 turns on the power to the projector 204 by energizing a power wire contained in the projector control cable 206. The sequence then moves to step S1206. If in step S1204 it is determined that the power is on, the sequence moves directly to step S1206.

In step S1206, the CPU 401 communicates a display request to the projector 204. Then, in step S1207, the CPU 401 uses the compressor 413 to compress the image data read from the document by the reader function unit 201 and converted into data, and stores the compressed image data in the RAM 402. Here, the CPU 401 calculates the size of the image data after compression, as well as the size of the image data in a case where the resolution thereof has been converted, as the data size of the image read by the reader function unit 201. Here, the "image data in the case where the resolution thereof has been converted" is image data converted to a lower resolution, and the data size is smaller than that of the image data before the conversion. The actual processing performed when reading after resolution conversion is the process of step S1216, which is described below. Furthermore, in step S1208, the CPU 401 acquires the free space in the RAM 612, calculated by the CPU 610 of the projector 204, after which the sequence moves to step S1209. An example in which the CPU 401 acquires the free space in the RAM 612 from the CPU 610, and the processing from step S1209 onward is then executed, is described here. However, the present disclosure is not limited thereto, and for example, the CPU 401 may notify the CPU 610 of the projector 204 of the size of the image data calculated in step S1207, and the subsequent processing may then be executed by the CPU 610.

In step S1209, the CPU 401 determines whether or not image data having the image size acquired in step S1207 can be stored in the RAM 612 based on the free space in the RAM 612 communicated by the CPU 610. If the image data cannot be stored in the RAM 612, the sequence moves to step S1211, whereas if the image data can be stored in RAM 612, the sequence moves to step S1210. In step S1211, the CPU 401 determines whether or not the image data can be stored in the RAM 612 at the size of the image data after resolution conversion. If the data can be stored, the sequence moves to step S1216, and if not, the sequence moves to step S1212.

In step S1212, the CPU 401 determines whether or not the image data can be saved to the storage medium 692. If the image data can be saved, the sequence moves to step S1213, and if not, the sequence moves to step S1214. In step S1213, the CPU 401 saves the image data to the storage medium 692, after which the sequence returns to step S1209, where it is once again determined whether or not the image data can be stored in the RAM 612. This is because the image data that has been processed for display by the projector 204 is deleted from the RAM 612, and it is therefore necessary to confirm again whether the free space has been secured. If free space cannot be secured in the RAM 612 even after this, the image data has already been saved to the storage medium 692 once, and thus the processes of steps S1212 and S1213 are skipped and the determinations of steps S1209 and S1211 are made periodically.

On the other hand, if it is determined in step S1212 that the image data cannot be saved to the storage medium 692, the sequence moves to step S1214, where the CPU 401 determines whether or not free space has been created in the RAM 612. The system waits until the free space is secured in the RAM 612, due to the presentation ending or the like, and when sufficient free space has been secured, the sequence moves to step S1216. In addition to the determination in step S1214, the same determination as that of step S1211 may be added.

If it is determined in step S1211 that the image can be stored in the RAM 612 after resolution conversion, the sequence moves to step S1216, where the CPU 401 sets the resolution conversion, reads the image, and calculates the number of images that can be stored in the RAM 612, after which the sequence moves to step S1217. If it is determined in step S1209 that the image can be stored in the RAM 612 without resolution conversion, the sequence moves to step S1210, where the CPU 401 calculates the number of images that can be stored. The sequence then moves to step S1215, where the CPU 401 reads the image without setting resolution conversion, after which the sequence moves to step S1217.

When the image reading is complete, the sequence moves to step S1217, where the CPU 401 transfers the image data of the number of images to be stored in the RAM 612. The remaining images are transferred to the HDD 407 for storage. Then, in step S1219, the CPU 401 determines whether or not the image stored in the HDD 407 can be transferred to the projector 204. If the image can be transferred, the sequence moves to step S1220, where the remaining images are transferred to the projector 204, after which the sequence ends.

It is also possible to encode the image data located in the RAM 402 in a moving image format. The CPU 401 encodes the image data through the moving image encoder 1107 via the system bus 416. The encoded data can be displayed in the web browser of the PC 107 through the web conference system client 1132 and the relay service 1120.

Printing a Projected Image

Figure 13:
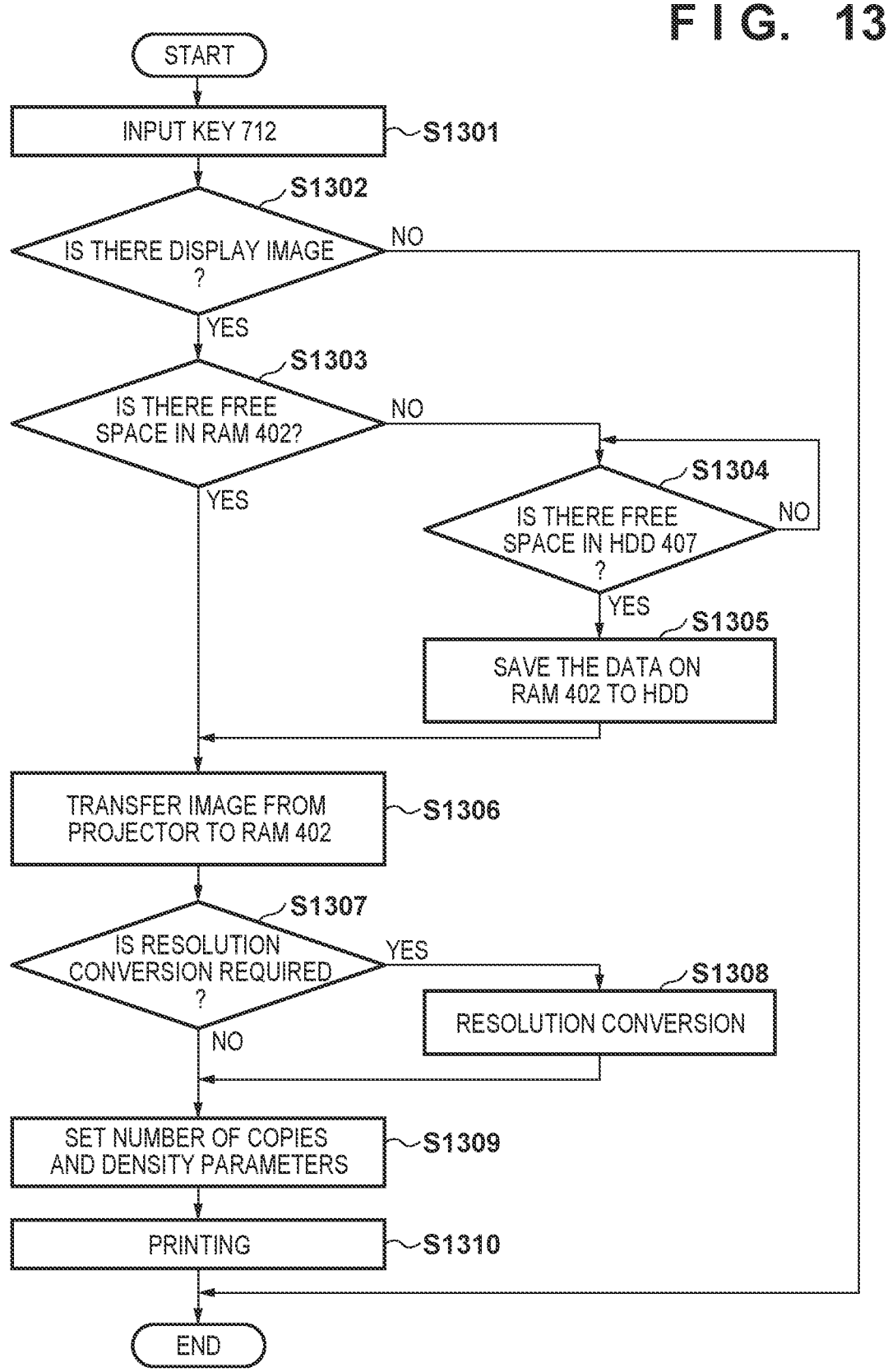
FIG. 13 is a flowchart illustrating using the printer function unit 202 to print an image displayed by the projector 204 according to the embodiment.

A processing sequence for printing the image displayed by the projector 204 using the printer function unit 202 will be described next with reference to FIG. 13. The processing described below is realized by, for example, the CPU 401 reading out a program, stored in the ROM 406, the HDD 407, or the like in advance, into the RAM 402 and executing that program. Here, the projector image print key 712 is selected in the screen 702, and a transition to the screen 703 is made.

In step S1301, when the user presses the print start key 748 in the screen 703, the CPU 401 confirms the state of the projector 204 from the projector I/F 443 through the projector control cable 206. Next, in step S1302, the CPU 401 determines whether or not an image is displayed in the projector 204 in accordance with the state of the projector 204 acquired in step S1301. If so, the sequence moves to step S1303, and if not, the sequence ends.

In step S1303, the CPU 401 determines whether or not there is free space in the RAM 402 that stores printed images. The sequence moves to step S1306 when enough free space can be secured. If enough free space cannot be secured, the sequence moves to step S1304, where the CPU 401 confirms the free space in the HDD 407. If in step S1304 enough free space can be secured in the HDD 407, the sequence moves to step S1305, where the CPU 401 retracts the data in the RAM 402 to the HDD 407, after which the sequence moves to step S1306. On the other hand, if in step S1304 free space cannot be secured in the HDD 407, the system stands by until the free space can be secured.

In step S1306, the CPU 401 sends the image displayed by the projector 204 from the projector 204 to the RAM 402. Then, in step S1307, the CPU 401 acquires information of the resolution of the sent image, and determines whether or not the image can be printed as-is. If resolution conversion is required, the sequence moves to step S1308, where the CPU 401 performs resolution conversion on the image data. The sequence then moves to step S1309. If the image can be printed as-is, the sequence moves to step S1309.

In step S1309, the CPU 401 sets the number of copies to be printed, density parameters, and the like according to the user settings, and executes printing in step S1310. In this manner, when printing the screen of a web conferencing system displayed by the projector 204, the projected image data in the RAM 402 can be transferred from the projector 204, and image data in the RAM 402 can be sent to the printer function unit 202 for printing.

Projecting Read Image While Projector is Running

Figure 14A:
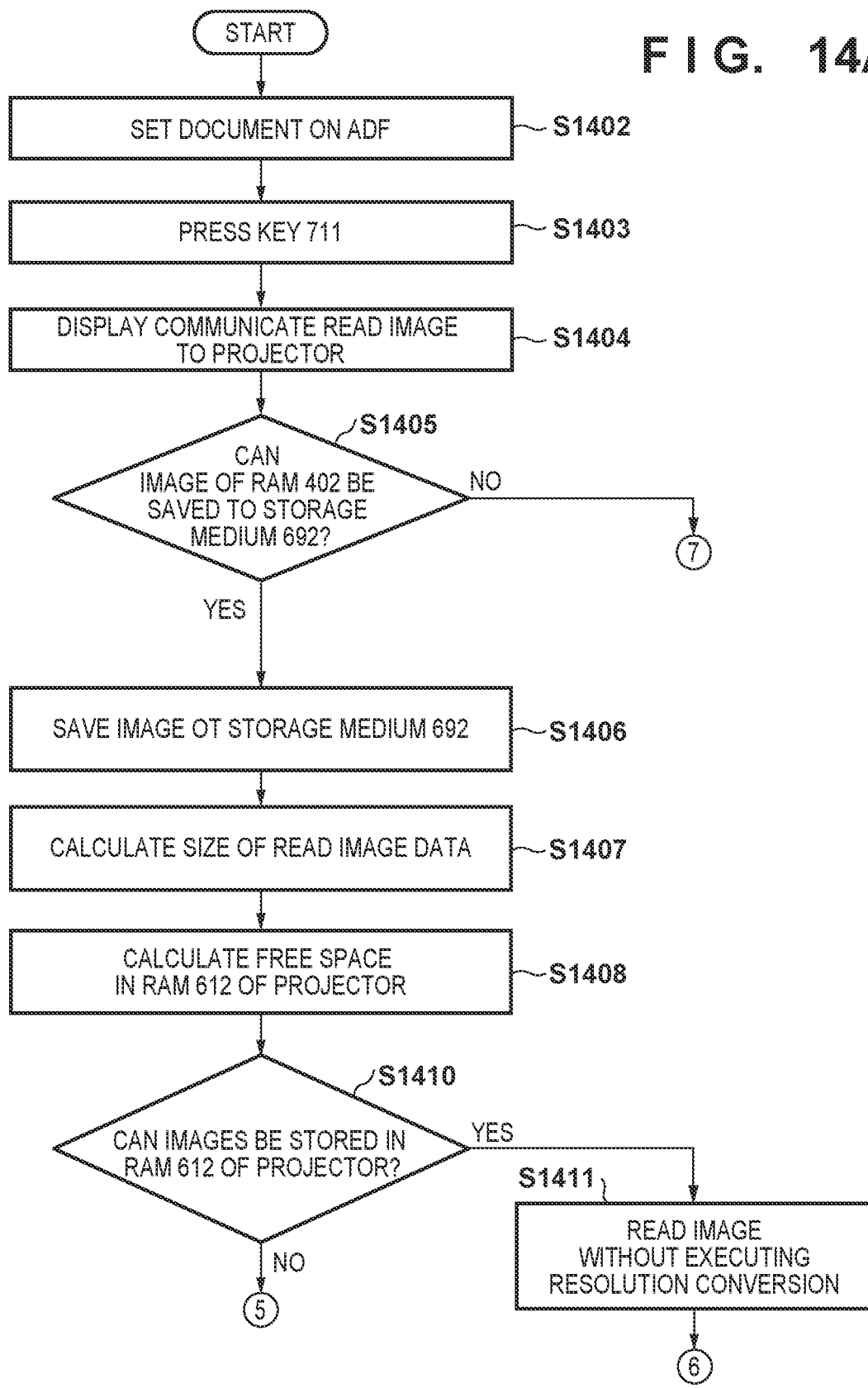
FIGS. 14A-14B are a flowchart illustrating using the printer function unit 202 to print an image displayed by the projector 204 according to the embodiment.
Figure 14B:
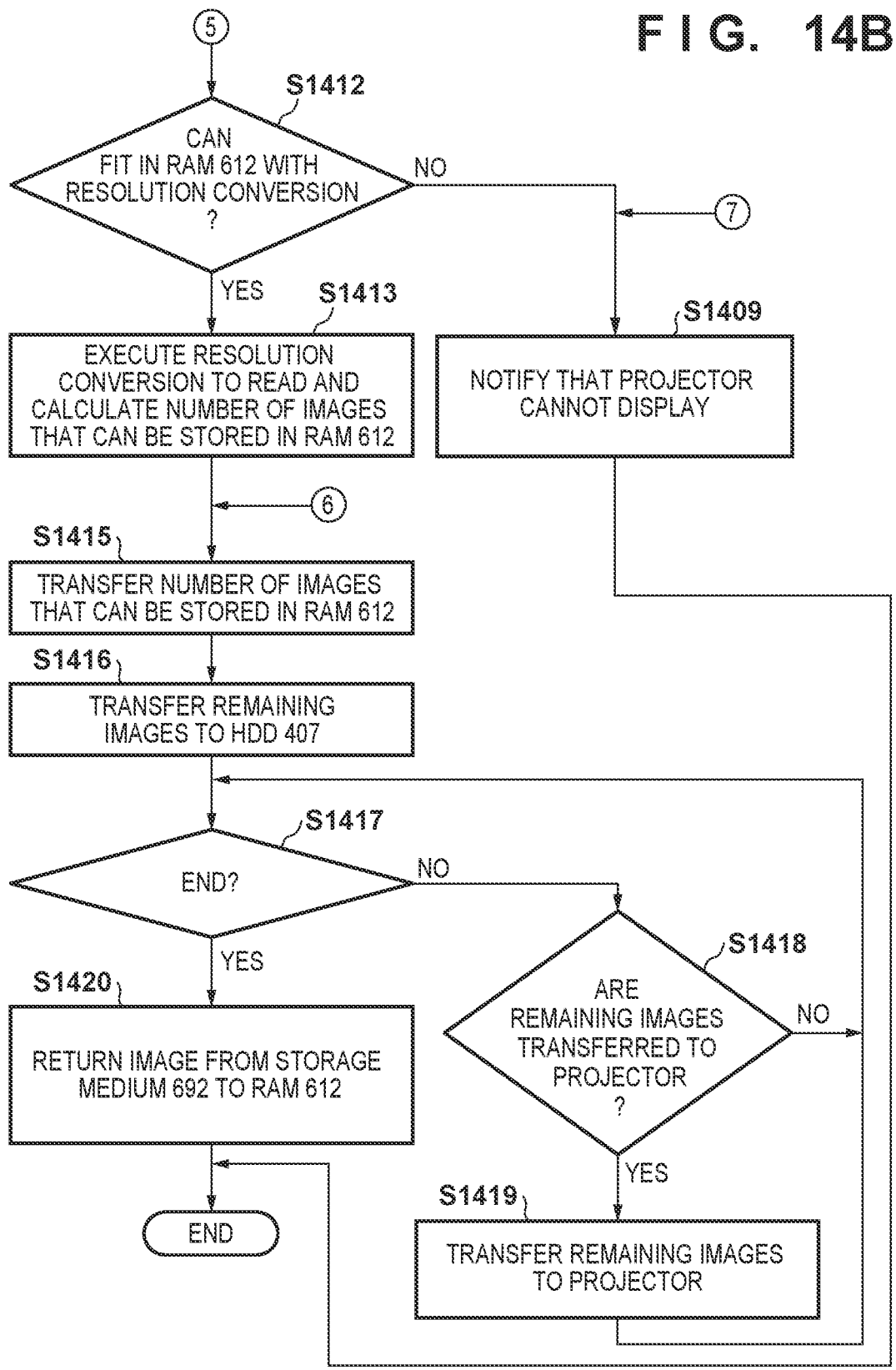

A processing sequence performed when reading an image using the reader function unit 201 and projecting the image, when presentation data from the external PC 105 is being displayed, will be described with reference to FIGS. 14A-14B. The processing described below is realized by, for example, the CPU 401 reading out a program, stored in the ROM 406, the HDD 407, or the like in advance, into the RAM 402 and executing that program.

In step S1402, the CPU 401 detects that a document has been placed on an ADF by the user. Then, in step S1403, the CPU 401 detects that the post-reading projector display key 711 in the operation unit 250 has been pressed by the user. Specifically, for user operations performed through the operation unit 250, commands (operation information) are sent to the system bus 416 through the operation unit I/F 403 and are communicated to the CPU 401. The CPU 401 may start reading the document placed on the ADF using the reader function unit 201 at this timing. The timing of the start of reading may be any timing, such as, for example, after it is confirmed that the projector 204 is powered on (described later).

Then, in step S1404, the CPU 401, which has been notified of the command, notifies the projector 204 of the display of the read image. Then, in step S1405, the CPU 401 determines whether or not the image in the RAM 402 can be retracted to the storage medium 692. If the image cannot be retracted, the sequence moves to step S1409, where the CPU 401 makes a notification that the image cannot be displayed by the projector 204. The flowchart then ends. On the other hand, if the image can be retracted, the sequence moves to step S1406, where the CPU 401 retracts the data in the RAM 402 to the storage medium 692.

Next, in step S1407, the CPU 401 uses the compressor 413 to compress the image data read from the document by the reader function unit 201 and converted into data, and stores the compressed image data in the RAM 402. Here, the CPU 401 calculates the size of the image data after compression, as well as the size of the image data in a case where the resolution thereof has been converted, as the data size of the image read by the reader function unit 201. Here, the "image data in the case where the resolution thereof has been converted" is image data converted to a lower resolution, and the data size is smaller than that of the image data before the conversion. The actual processing performed when reading after resolution conversion is the process of step S1413, which is described below. Furthermore, in step S1408, the CPU 401 acquires the free space in the RAM 612, calculated by the CPU 610 of the projector 204, after which the sequence moves to step S1410. An example in which the CPU 401 acquires the free space in the RAM 612 from the CPU 610, and the processing from step S1410 onward is then executed, is described here. However, the present disclosure is not limited thereto, and for example, the CPU 401 may notify the CPU 610 of the projector 204 of the size of the image data calculated in step S1407, and the subsequent processing may then be executed by the CPU 610.

In step S1410, the CPU 401 determines whether or not image data having the image size acquired in step S1407 can be stored in the RAM 612 based on the free space in the RAM 612 communicated by the CPU 610. If image data can be stored in the RAM 612, the sequence moves to step S1411, where the CPU 401 executes the reading processing without setting resolution conversion. The sequence then moves to step S1415. On the other hand, if the image data cannot be stored in the RAM 612, the CPU 401 confirms whether the image data can be stored in the RAM 612 after performing resolution conversion. If the image data cannot be stored, the sequence moves to step S1409, where the CPU 401 makes a notification that the image cannot be displayed by the projector. The flowchart then ends. This notification may be displayed in the operation unit 250 of the MFP 101, or the information may be sent to an external device such as the PC 103, 105, or 107 and displayed in a display unit of the destination. On the other hand, if the image data can be stored in the RAM 612, the sequence moves to step S1413, where the CPU 401 sets the resolution conversion, performs the reading processing, and calculates the number of images to be stored in the RAM 612. The sequence then moves to step S1415.

Next, in step S1415, the CPU 401 transfers the image data of the images that can be stored in the RAM 612 to the projector 204. In step S1416, the CPU 401 transfers the image data of the remaining images that were not transferred in S1415 to the HDD 407 on the controller side. Then, in step S1417, the CPU 401 determines whether or not the input of the display end key 744 for the scan image has been accepted. When the input of the display end key 744 is accepted, the sequence moves to step S1420, where the CPU 401 transfers the image from the storage medium 692 to the RAM 612 and returns to the original presentation, after which the flowchart ends. On the other hand, when it is determined in step S1417 that the display end key 744 has not been operated (for example, when the next page key 742 for the scan image has been input), the sequence moves to step S1418, where the CPU 401 determines whether or not it is necessary to transfer the image to the HDD 407. If it is necessary, the sequence moves to step S1419, where the CPU 401 transfers the image to the projector 204 and displays the image, after which the sequence returns to step S1417. Additionally, if it is determined that there is no need for the transfer in step S1418, the sequence returns to S1417. After that, the CPU 401 stands by until the input of the end key 744 is accepted, after which the sequence moves to the above-described step S1420, and the flowchart ends.

It is also possible to encode the image data located in the RAM 402 in a moving image format, and the encoding is carried out through the moving image encoder 1107 via the system bus 416. The encoded data can be displayed in the web browser of the PC 107 through the web conference system client 1132 and the relay service 1120.

As described thus far, the image processing apparatus according to the present embodiment includes a scanner that reads images from a document and a projector that projects images according to image data. The image processing apparatus also displays an operation screen in a display unit of the image processing apparatus or a display unit of an external apparatus that accepts a first instruction for the projector to project an image read by the scanner. Furthermore, upon receiving the first instruction, the image processing apparatus transfers the image data of the image scanned by the scanner to the projector for projection, in accordance with the free space in the memory of the projector. The image processing apparatus further includes a printer unit that prints images on sheets according to image data, and the operation screen can further accept a second instruction to print the image being projected by the projector. Upon receiving the second instruction, the image processing apparatus can acquire the image data of the image being projected by the projector from the projector, convert the image data into printable image data, transfer the data to the printer, and have the printer execute printing of the image. Furthermore, the image processing apparatus can accept a third instruction to project the image scanned by the scanner using the projector while the image is being projected using the projector. Upon accepting the third instruction, the image processing apparatus can transfer the image data of the image read by the scanner to the projector for projection instead of the image being projected, and then return to the image being projected in response to a user instruction.

In this manner, according to the present embodiment, images scanned from a document can be projected by a projector according to a simple operation made by the user. Embodiments of the present disclosure can also print content projected by a projector according to a simple operation made by a user. Additionally, even while the projector is projecting, other images can be read by the scanner and inserted for projection. In this manner, the image processing apparatus according to the present embodiment can print the image displayed by the projector as-is. Images can be printed as needed without having to print all the displayed presentation data out, which makes it possible to take notes in a timely manner and improve business efficiency. In addition, when a participant wishes to indicate that they wish to make a change during a presentation, they can read figures, tables, and documents with words written on the spot and display those items directly through the projector instead of verbally. This allows the participant to communicate their intentions to others, and to communicate their intentions directly.

As described thus far, according to the present disclosure, it is possible to project images scanned by a scanner using a projector according to a simple operation made by the user. Therefore, the conventional method of reading an image once with a scanner, converting the image into image data, storing the image data in an external apparatus such as a PC, visualizing the stored image data using an application in a PC or the like, and then projecting the image using a projector can now be executed in a single step. This makes it possible for a participant to visualize their thoughts on the spot using handwriting or the like when they are having trouble communicating their thoughts in a meeting, and to project those visualized thoughts for sharing, which promotes effective meetings. Additionally, during a presentation meeting, if notes were written on the presentation slides being displayed, they would be written in a text document to take notes or the like. There were cases when the memo was delayed or misplaced while the presentation was in progress, and when the memo was read back later, the memo did not match the image on the presentation slide and the memo was therefore useless. However, the image of a presentation being displayed can be printed as-is on the spot, which makes it possible to take memos and associate the memo with the presentation slide when reviewing the memo. This makes it possible to take useful memos, and eliminates missing information.

In addition, there is a web conferencing function as a function that uses the projector. If this web conferencing function is coupled with the function of the projector, it is possible to read and display data using the projector while sharing the with the web conferencing system during a web conference using the web conferencing function.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-161326, filed Sep. 25, 2020, which is hereby incorporated by reference herein in its entirety.

What is claimed is:

1. An image processing apparatus comprising:
a reader that reads an image from a document;
a projection unit that projects an image;
a printer that prints an image onto a sheet;
an operation unit that accepts a first instruction for the projection unit to project the image read by the reader and a second instruction for the printer to print the image projected by the projection unit; and
a control unit,
wherein in a case where the first instruction is accepted by the operation unit, the control unit causes the projection unit to project the image read by the reader, and
in a case where the second instruction is accepted by the operation unit, the control unit causes the printer to print the image being projected by the projection unit.

2. The image processing apparatus according to claim 1, wherein in a case where the second instruction is accepted by the operation unit, the control unit converts the image being projected by the projection unit into an image that can be printed, and the control unit causes the printer to print the image that has been converted.

3. The image processing apparatus according to claim 1, wherein the operation unit can further accept a third instruction for the projection unit to project the image read by the reader while an image is being projected by the projection unit, and
in a case where the third instruction is accepted by the operation unit, the control unit causes the projection unit to project the image read by the reader instead of the image being projected.

4. The image processing apparatus according to claim 3, further comprising:
a storage unit,
wherein in a case where the first instruction is accepted by the operation unit, the control unit determines whether or not a size of image data of the image read by the reader is a size that can be stored in the storage unit, and
in a case where the size of the image data is a size that cannot be stored in the storage unit, the control unit reduces a resolution and causes the reader to read the document at the resolution that has been reduced.

5. The image processing apparatus according to claim 3, further comprising:
a storage unit,
wherein in a case where the first instruction is accepted by the operation unit, the control unit determines whether or not a size of image data of the image read by the reader is a size that can be stored in the storage unit, and
in a case where the size of the image data is a size that cannot be stored in the storage unit, the control unit stands by until sufficient free space can be secured in the storage unit.

6. The image processing apparatus according to claim 3, further comprising:
a storage unit,
wherein after the third instruction has been accepted by the operation unit, the control unit reduces a resolution, and then in a case where it is determined that a size of image data of an image read from the document by the reader at a resolution that has been reduced is a size that cannot be stored in the storage unit, the control unit makes a notification that the image cannot be projected by the projection unit.

7. The image processing apparatus according to claim 1, wherein the operation unit displays, in a display unit, a first operation screen pertaining to a basic menu of the image processing apparatus, and
an object for making the first instruction is included in the first operation screen.

8. The image processing apparatus according to claim 7, wherein the operation unit displays, in the display unit, a second operation screen pertaining to a function of the projection unit, and
an object for making the second instruction is included in the second operation screen.

9. A method of controlling an image processing apparatus, the image processing apparatus including a reader that reads an image from a document, a projection unit that projects an image, and a printer that prints an image onto a sheet, the method comprising:
accepting a first instruction for the projection unit to project the image read by the reader and a second instruction for the printer to print the image projected by the projection unit;
in a case where the first instruction is accepted in the accepting, causing the projection unit to project the image read by the reader; and
in a case where the second instruction is accepted in the accepting, causing the printer to print the image being projected by the projection unit.

10. A non-transitory computer-readable storage medium storing a computer program for causing a computer to execute a method of controlling an image processing apparatus, the image processing apparatus including a reader that reads an image from a document, a projection unit that projects an image, and a printer that prints an image onto a sheet, the method comprising:
accepting a first instruction for the projection unit to project the image read by the reader and a second instruction for the printer to print the image projected by the projection unit;
in a case where the first instruction is accepted in the accepting, causing the projection unit to project the image read by the reader; and
in a case where the second instruction is accepted in the accepting, causing the printer to print the image being projected by the projection unit.

* * * * *